（12）United States Patent
Schmidt

(10) Patent No.: US 10,999,079 B2
(45) Date of Patent: May 4, 2021

(54) SYSTEM AND METHOD FOR HIGH TRUST CLOUD DIGITAL SIGNING AND WORKFLOW AUTOMATION IN HEALTH SCIENCES

(71) Applicant: SURECLINICAL INC., Rancho Cordova, CA (US)

(72) Inventor: Zachariah Schmidt, Rancho Cordova, CA (US)

(73) Assignee: SureClinical Inc., Rancho Cordova, CA (US)

( * ) Notice: Subject to any disclaimer, the term of this patent is extended or adjusted under 35 U.S.C. 154(b) by 0 days.

(21) Appl. No.: 16/820,492

(22) Filed: Mar. 16, 2020

(65) Prior Publication Data

US 2020/0220733 A1    Jul. 9, 2020

Related U.S. Application Data

(63) Continuation of application No. 16/632,248, filed as application No. PCT/US2014/069138 on Dec. 8, 2014.

(Continued)

(51) Int. Cl.
*H04L 9/32* (2006.01)
*H04W 12/06* (2021.01)
*H04W 12/10* (2021.01)

(52) U.S. Cl.
CPC .......... *H04L 9/3247* (2013.01); *H04L 9/3228* (2013.01); *H04W 12/0608* (2019.01);
(Continued)

(58) Field of Classification Search
CPC . H04L 9/3247; H04L 9/3228; H04L 2209/80; H04W 12/0609; H04W 12/0608
See application file for complete search history.

(56) References Cited

U.S. PATENT DOCUMENTS 5,659,616 A * 8/1997 Sudia ................. G06Q 20/3821
705/76
6,292,830 B1    9/2001 Taylor et al.
(Continued)

FOREIGN PATENT DOCUMENTS

| WO | WO2008/113302 A2 | 9/2008 |
| WO | WO2013/010172 A2 | 1/2013 |

OTHER PUBLICATIONS

Schmidt, Z., Notice of Allowance, U.S. Appl. No. 12/820,045, dated Feb. 2, 2016, 19 pgs.

(Continued)

*Primary Examiner* — Yonas A Bayou
(74) *Attorney, Agent, or Firm* — Morgan, Lewis & Bockius LLP

(57) ABSTRACT

Methods and systems for obtaining a high trust digital signature from a signer utilizing a high trust signature mobile device are described. Some embodiments include receiving, at the high trust signature mobile device, a signature request regarding a document that requires a high trust digital signature. The signature request includes a one-time signer authentication code. The document that requires the high trust digital signature is displayed on the mobile device. Then a plurality of signer verification elements is obtained. Obtaining a plurality of signer verification elements includes obtaining from the signer a signer-specific password. Furthermore, it includes automatically applying the one-time signer authentication code obtained from the signature request. Then the signature request is replied to by providing the plurality of signer verification elements to a server system for verification. Once the signer verification elements are validated, the high trust signature is applied to the document.

23 Claims, 13 Drawing Sheets

Related U.S. Application Data

(60) Provisional application No. 61/913,829, filed on Dec. 9, 2013.

(52) U.S. Cl.
CPC ....... *H04W 12/0609* (2019.01); *H04W 12/10* (2013.01); *H04L 2209/80* (2013.01)

(56) References Cited

U.S. PATENT DOCUMENTS

| | | | |
|---|---|---|---|
| 7,043,754 B2 * | 5/2006 | Arnouse | G06K 7/10079 726/20 |
| 7,353,183 B1 | 4/2008 | Musso | |
| 8,516,562 B2 * | 8/2013 | Headley | H04L 9/3231 726/7 |
| 2001/0027527 A1 * | 10/2001 | Khidekel | H04L 63/0861 726/9 |
| 2002/0035484 A1 * | 3/2002 | McCormick | G16H 20/10 705/2 |
| 2003/0070100 A1 * | 4/2003 | Winkler | G07F 17/32 726/26 |
| 2003/0135740 A1 | 7/2003 | Talmor et al. | |
| 2004/0117215 A1 | 6/2004 | Marchosky | |
| 2004/0162831 A1 | 8/2004 | Patterson | |
| 2004/0254848 A1 * | 12/2004 | Golan | G06Q 20/4037 705/50 |
| 2005/0138382 A1 | 6/2005 | Hougaard et al. | |
| 2005/0160084 A1 | 7/2005 | Barrett | |
| 2006/0106757 A1 | 5/2006 | Sakai et al. | |
| 2006/0265731 A1 | 11/2006 | Matsuda | |
| 2007/0136262 A1 | 6/2007 | Dettinger et al. | |
| 2007/0186164 A1 | 8/2007 | Getsch | |
| 2007/0204164 A1 | 8/2007 | Cattrone et al. | |
| 2007/0255512 A1 | 11/2007 | Delenstarr et al. | |
| 2007/0291996 A1 * | 12/2007 | Hoffman | G07C 9/38 382/115 |
| 2008/0017722 A1 | 1/2008 | Snyder et al. | |
| 2008/0059250 A1 * | 3/2008 | Joao | G16H 40/67 705/3 |
| 2008/0098232 A1 | 4/2008 | Miyazaki et al. | |
| 2008/0133295 A1 | 6/2008 | Cappel et al. | |
| 2008/0144936 A1 | 6/2008 | Nishikawa | |
| 2008/0174790 A1 | 7/2008 | Noguchi et al. | |
| 2008/0260287 A1 | 10/2008 | Berryman et al. | |
| 2008/0298631 A1 | 12/2008 | Nishida | |
| 2009/0001167 A1 | 1/2009 | Usuba | |
| 2009/0070348 A1 | 3/2009 | Uejo | |
| 2010/0042585 A1 | 2/2010 | Adler | |
| 2010/0088233 A1 * | 4/2010 | Tattan | G06F 21/6209 705/50 |
| 2010/0114900 A1 | 5/2010 | Anderson | |
| 2013/0019289 A1 * | 1/2013 | Gonser | G06Q 20/3825 726/6 |

OTHER PUBLICATIONS

Schmidt, Z., Office Action U.S. Appl. No. 12/820,045, dated Sep. 28, 2015, 21 pgs.

Schmidt, Z., Office Action U.S. Appl. No. 12/820,045, dated May 7, 2015, 22 pgs.

Schmidt, Z., Office Action U.S. Appl. No. 12/820,045, dated Sep. 10, 2014, 20 pgs.

Schmidt, Z., Final Office Action U.S. Appl. No. 12/820,045, dated May 28, 2014, 20 pgs.

Schmidt, Z., Office Action U.S. Appl. No. 12/820,045, dated Oct. 20, 2013, 20 pgs.

Schmidt, Z., Final Office Action UU.S. Appl. No. 12/820,045, dated Feb. 11, 2013, 24 pgs.

Schmidt, Z., Office Action U.S. Appl. No. 12/820,045, dated Oct. 25, 2012, 19 pgs.

Schmidt, Z., Office Action U.S. Appl. No. 15/376,632, dated Mar. 6, 2017, 32 pgs.

Schmidt, Z., Final Office Action UU.S. Appl. No. 15/376,632, dated Aug. 21, 2019, 35 pgs.

Schmidt, Z., Office Action U.S. Appl. No. 15/376,632, dated Mar. 22, 2018, 43 pgs.

Schmidt, S., Final Office Action, U.S. Appl. No. 15/376,632, dated Oct. 15, 2018, 44 pgs.

Sureclinical, International Search Report, PCTUS2014/069138, dated Mar. 30, 2015, 15 pgs.

Sureclinical, International Preliminary Report on Patentability, PCTUS2014/069138, dated Jun. 14, 2016, 12 pgs.

* cited by examiner

SYSTEM AND METHOD FOR HIGH TRUST CLOUD DIGITAL SIGNING AND WORKFLOW AUTOMATION IN HEALTH SCIENCES

RELATED APPLICATIONS

This application is a continuation of U.S. application Ser. No. 16/632,248, filed Jan. 17, 2020, entitled "System and Method for High Trust Cloud Digital Signing and Workflow Automation in Health Sciences," which is a National Stage Entry of PCT Application No. PCT/US2014/069138, filed Dec. 8, 2014, entitled "System and Method for High Trust Cloud Digital Signing and Workflow Automation in Health Sciences," which claims priority to U.S. Provisional Patent Application Ser. No. 61/913,829, filed Dec. 9, 2013, entitled "System and Method for High Trust Cloud Digital Signing and Workflow Automation in Health Sciences," each of which is incorporated by reference herein in its entirety.

TECHNICAL FIELD

This application relates generally to mechanisms for obtaining high trust digital signatures and creating corresponding workflows. In some embodiments, these methods are specifically used for obtaining high trust digital signatures on healthcare or clinical trial regulatory documents, referred to as the health sciences area.

BACKGROUND

Pharmaceutical clinical trials (often referred to as "studies" in the pharmaceutical industry) play an important role in drug development, because clinical trials are used to collect safety and efficacy data of drug candidates (e.g., small molecules, biologics, and combination devices). In most cases, it costs a pharmaceutical companies millions to conduct each clinical trial. For instance, the average cost to create a new drug is $5 Billion, taking approximately 10-15 years. As a result of these costs, every day spent in the clinical trial development and testing phase can cost a company over a million dollars per day in lost drug revenues. Safety and efficacy data from clinical trials, and sometimes even communications to and from clinical trial investigators (also called principal investigators) and other documents, need to be recorded accurately and maintained pursuant to government regulations in order for the drug candidates to obtain regulatory approval by government agencies.

Many clinical trial documents require signatures (e.g., from clinical trial investigators or patients). Currently, hardcopy documents (e.g., documents printed on paper), rather than softcopy documents (e.g., electronic documents), are frequently used in clinical trials for various reasons (e.g., ease to prove authenticity and integrity). However, tracking and maintaining all regulatory documents throughout clinical trials, some of which may last years, is not an easy task. The cost of completing, signing, acquiring, shipping, and tracking hardcopy documents is significant, and includes costly manual labor and shipping costs. Therefore, in order to reduce the costs inherent in hardcopy paper-based processes, there is a need for a better system and method for obtaining signatures that can be trusted and authenticated on softcopy clinical trial regulatory documents.

SUMMARY

A number of embodiments (e.g., of server systems, client systems or devices, and methods of operating such systems or devices) that overcome the limitations and disadvantages described above are presented below. These embodiments provide computer-implemented methods, systems, and graphical user interfaces (GUIs) for obtaining high trust digital signatures on clinical trial regulatory documents.

This invention provides methods and apparatuses, including computer programs and server hardware products for provisioning and applying highly trusted, verifiable digital signatures to electronic documents and images from desktop, mobile or network-connected devices, using a document viewer with the ability to see what you sign, and then to apply digital signatures to these documents, and finally to authenticate signing parties using multi-factor authentication and verification of the signer's credentials from a central, public Certificate Authority (e.g., an ISO 32000 compliant PDF viewer). In one embodiment, documents that require signing are stored on a Document Management Server, and details of how documents should be processed for signing are managed by a workflow manager process, which captures details such as documents to be signed, signing locations, signing parties, due dates, notifications, and required metadata.

As described in more detail below, some embodiments involve a computer-implemented method performed on a high trust signature mobile device having one or more processors and memory storing one or more programs for execution by the one or more processors to perform the method. The method includes receiving, at the high trust signature mobile device, a signature request regarding a document that requires a high trust digital signature. The signature request includes a one-time signer authentication code. The document that requires the high trust digital signature is displayed on the mobile device. A plurality of signer verification elements is obtained. Obtaining plurality of signer verification elements includes obtaining from the signer a signer-specific password. Furthermore, it includes automatically applying the one-time signer authentication code obtained from the signature request. Then the signature request is replied to by providing the plurality of signer verification elements to a server system for verification.

Similarly, some embodiments involve a computer-implemented method performed on a client computer, such as a desktop or tablet having one or more processors and memory storing one or more programs for execution by the one or more processors to perform the method. The method includes receiving a signature request regarding a document that requires a high trust digital signature. The client displays the document that requires the high trust digital signature. Then a plurality of signer verification elements is obtained. Obtaining the plurality of signer verification elements includes obtaining a signer-specific password and obtaining a one-time signer authentication code. The one-time signer authentication code was provided to a high trust signature mobile device distinct from the client computer and thus cannot be automatically obtained and applied. For instance, the signer will likely read it from the high trust signature mobile device and enter it on the client computer. Then the signature request is replied to by providing the plurality of signer verification elements to a server system for verification.

In accordance with some embodiments, a computer-implemented method is performed at a computer system having one or more processors and memory storing one or more programs for execution by the one or more processors to perform the method. The method includes sending to a high trust signature mobile device a signature request regarding a document that requires a high trust digital signature. The signature request includes a one-time signer authentication code. The document that requires the high trust digital signature is also sent to the high trust signature mobile device. Then a plurality of signer verification elements is obtained from the high trust signature mobile device. The plurality of signer verification elements includes a signer-specific password and the one-time signer authentication code sent to the high trust signature mobile device. Then the computer system validates the plurality of signer verification elements.

Similarly, in accordance with some embodiments, a computer-implemented method is performed at a computer system having one or more processors and memory storing one or more programs for execution by the one or more processors to perform the method. The method includes sending to a client computer, such as a desktop or tablet, a signature request regarding a document that requires a high trust digital signature. The method also includes sending to a high trust signature mobile device a one-time signer authentication code. The document that requires the high trust digital signature is sent to the client computer for display. Then a plurality of signer verification elements is obtaining from the client computer. The plurality of signer verification elements include a signer-specific password and the one-time signer authentication code which was sent to the high trust signature mobile device distinct from the client computer since it is the client computer cannot be automatically obtained and applied. Then the computer system validates the plurality of signer verification elements.

In other embodiments a method is performed at a computer system having one or more processors and memory storing one or more programs for execution by the one or more processors to perform the method. A document that requires a high trust digital signature is specified. A signer to apply a high trust digital signature to the document is also specified. A locked version of the document is obtained. Then a location for the high trust digital signature is specified in the locked version of the document. Finally, a signature request is sent to the signer.

Some embodiments provide a method and system to dynamically provision highly trusted "level three" digital certificates, or Digital IDs that are used for signing purposes, to mobile or remote users. In some embodiments, the method used to provision Digital IDs' new prospective signers utilizes multi-factor authentication and storage of the user's Digital ID on a NIST-approved FIPS-140-2 'level 3' HSM (HSM), with identity verification being made through a combination of administrative review of a prospective signer's evidence of identity including: 1) government issued photo ID credentials, 2) email address and 3) cellular phone number; these evidence of identification details may be viewed either real-time through a webcam or on demand by the administrator through files uploaded by the prospective signer. The Digital ID provisioning process enables a direct, secure server-to-server connection from the provisioning key server to a Certificate Authority. Digital IDs, or private keys, are generated and stored in the HSM, which is managed by the signing server. To sign documents, the Digital IDs are accessed by the user through a PIN code selected by the user in a Digital ID provisioning process.

In some embodiments, in order to sign electronic documents with the Digital ID, a method and apparatus is provided for viewing electronic documents in either the PDF or other internet standards-based image formats, and for digitally signing said electronic documents or images directly from a document viewer on desktop, mobile or other web browser-enabled network devices. In some embodiments, on web browser-enabled devices, the document viewer can run in as a web application without a browser plug-in for PDF viewing and signing. The electronic document viewer uses highly trusted Digital IDs to digitally sign documents and images. These Digital IDs can be verified through third-party applications.

In some embodiments, a method is provided for the selection of a digital signature "appearance" by the user during the provisioning process, as well as a method for one-click application of the digital signature on a mobile device. The user's digital signature appearance is created programmatically by entering the user's name, selecting from a variety of preselected script fonts, and presenting it in an image format to the user during the Digital ID provisioning process. Then future signings utilize the user-selected digital signature appearance. In some embodiments, the user can modify the digital signature appearance in the document viewer settings at any time. In some implementations, application of the signature appearance is completed through a "click to sign" button, whereby the signature appearance is applied to a preset location established on an application server by an administrator, or by the user through a drag and drop interface, whereby the signature block is dragged and dropped on the digital document, and resized by the user if needed.

Another feature relates to the process of notification, signing and verification of the user's identity at signing time. The process supports both mobile and desktop users, both of whom have SMS service or the like which is used in the signing event authentication and verification process. In some embodiments, first, both an email and an SMS message are sent to users notifying them that they have a document that needs to be signed. For mobile devices, the user can click on a link in the SMS which will open the document viewer in a browser on the mobile device to display the login screen; the SMS also includes a special one-time unique 6-digit signing ID code which is included in the URL like this: SureEsign.com/login?123456. In some embodiments, the SMS message includes a 'tiny URL' which is a coded representation that includes the six-digit authentication code element as well as a pointer link to the URL to view and sign the document. Desktop recipients click on the email link, which will open and display the login screen in a web browser. Under either configuration the users then enter their username/password to log in to the viewer application. Then, the users are presented with a "task summary" dialog box indicating that they have a document that needs to be reviewed and signed. To review and sign a document, the user clicks on the document name or on a dialog box link to launch and view the document in the Doc Viewer. After viewing the document in the Doc Viewer and when ready to sign, users click the Sign icon in the document viewer. After clicking the Sign icon, the signing dialog is presented, which asks the user for a PIN code, a reason for signing, and a one-time unique ID code. Desktop users need to enter the unique ID code that was sent to their mobile phones in the signing dialog. Mobile users do not need to enter a unique ID code, since it was included in the initial SMS message to the signer. The mobile client is able to read the 6-digit signing ID code from the URL. This code is prefilled in the mobile user verification form automatically so the user does not need to fill it in. After completing the information in the dialog box, the user clicks "Sign Now." Then the validation server confirms the entered information by, for instance, checking against the information stored in the HSM to confirm the PIN and the randomly generated one-time unique ID code. Once the information is validated, the Signing Server utilizes the private key to embed the user's high trust signature into the document.

In accordance with some embodiments, a system is provided that includes one or more processors, memory, and one or more programs stored in the memory. The one or more programs are configured for execution by the one or more processors. The one or more programs include instructions for performing any of the methods described above.

In accordance with some embodiments, a computer-readable storage medium is provided that stores one or more programs configured for execution by one or more processors of a computer system. The one or more programs include instructions for performing any of the methods described above.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 9 provides an exemplary illustration of a user interface for a signing application in accordance with some embodiments.

FIG. 11 provides an exemplary illustration of an interface for a signing application in accordance with some embodiments.

FIG. 12 provides another exemplary illustration of an interface for a signing application in accordance with some embodiments.

DESCRIPTION OF EMBODIMENTS

Figure 1:
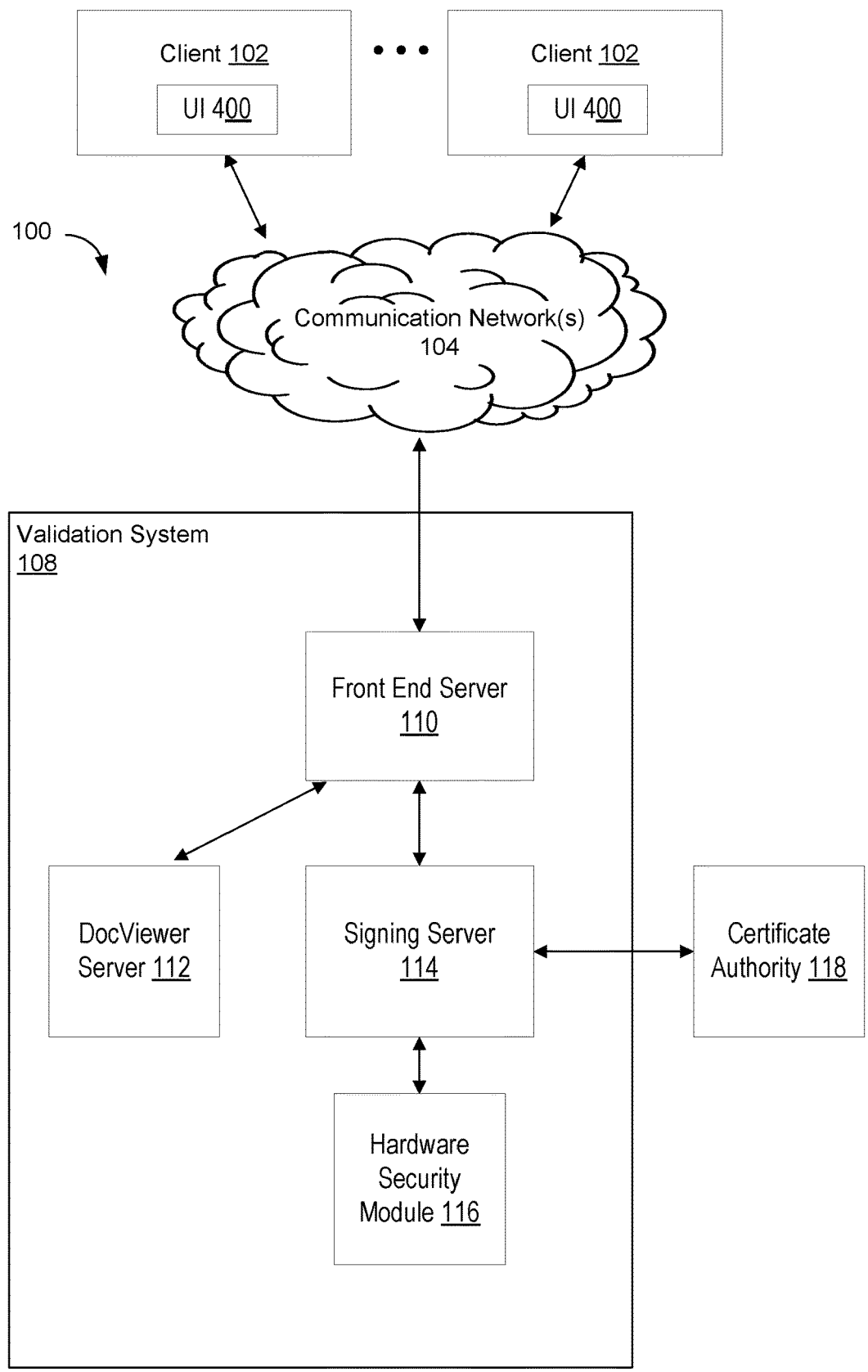
FIG. 1 is a block diagram illustrating an exemplary distributed computer system in accordance with some embodiments.

Methods and systems for managing and sharing clinical trial regulatory documents are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications, and equivalents that are within the spirit and scope of the invention as defined by the appended claims.

Moreover, in the following description, numerous details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

It will also be understood that, although the terms first, second, etc. may be used herein to describe various elements, these elements should not be limited by these terms. These terms are used only to distinguish one element from another. For example, a first signer could be termed a second signer and, similarly, a second contact could be termed a first contact without departing from the scope of the present invention. The first signer and the second signer are both Signers, but they are not the same signer.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on context. Similarly, the phrase "if it is determined" or "if [a stated condition or event] is detected" may be construed to mean "upon determining," "in response to determining," or "upon detecting (the stated condition or event)" or "in response to detecting (the stated condition or event)," depending on the context.

It is first noted that electronic signing is similar to but different from digital signing. Digital signing includes unambiguously identifying the signing party. In contrast, basic electronic signing may allow anyone to sign or make a mark on a digital document with minimal identification. Digital Signers use digital certificates issued by certificate authorities, and typically pass an initial identity vetting process in order to receive their digital signature signing credentials. The identity vetting process provides a high level of trust assurance of the signer's identity. After vetting, a digital credential or signing certificate is issued which can be used to digitally sign documents. Then a third party can verify a signer's identity by examining the signer's digital signature credentials that are published by the Certificate authority. Certificate Authorities offer various levels of trusted identities. Trust levels in Digital IDentities and signing is established by NIST and the US Office of Management and Budget (OMB). A "level 3" trust certificate, also known as a "high trust" certificate, is one of the highest digital certificate trust levels approved by OMB and NIST.

High trust 'level 3' certificates are frequently used by government agencies, banking, healthcare, legal and other industry areas where security, identify verification and document integrity in digital content and transaction signing is critically important.

In some embodiments, to provision a new signing certificate, the Certificate Authority conducts an initial vetting of the user's identity and then issues the prospective signer a digital signing certificate, also known as a 'Digital ID.' In some embodiments, the Digital ID uses a well-known x.509 Public-key cryptography certificate form which contains the user's private key certificate and a secret PIN code for digitally signing documents. The Digital ID has traditionally been delivered to the user on a secure, US NIST-approved FIPS-140 'level 3' compliant USB device or secure smart card. However, there are disadvantages to providing physical devices, as discussed below.

To digitally sign a document using a physical device, the user inserts the USB device into the PC, launches a signing program, views a document in the viewer and then signs the document (e.g., by dragging a square rectangle where the signature will be placed). The signer can optionally add other images and details to the signature at the time of signing. A signature is completed and applied to a document after the user enters his or her secret PIN code and sometimes a reason for signing. In some embodiments, the user's Digital ID is applied to a document using published cryptographic techniques in ISO standard 32000 for digital signing. The digital signature is embedded in the document, and any change to the document after signing invalidates the document and digital signature. A third party can verify the validity of a document signer's Digital ID credential in the document viewer by simply comparing the signer's digital certificate to a public version of the certificate which is available at the Certificate Authority's web site for validation purposes Central to the use of highly trusted Digital IDs is the provisioning and vetting of a new signer, the location where the Digital ID is stored, the method of accessing and applying the Digital ID (ideally from a multitude of devices), the ability of third parties to easily verify signed documents, and the ability to see what you sign. For provisioning of new users or organizations, high trust 'level 3' Digital IDs mandate that a Certificate Authority or its representative make both email contact and phone contact with a prospective new signer in what is known as a new subscriber vetting process. For compliance with 'level 3' high trust digital certificate policy, both 'level 3' certificates, as well as Digital IDs, must be stored in a US NIST-approved FIPS-140 'level 3' compliant HSM device. As such, a Digital ID is most often delivered to the user on a secure, US NIST-approved FIPS-140 'level 3' compliant USB device or secure smart card. The USB hardware device requirement is problematic for mobile users since they often don't have a USB port or smartcard reader, making digital signing impossible for most mobile users who don't have a USB port on their device.

The below described embodiments relate to provisioning and applying highly trusted (e.g., utilizing 'level 3' trust certificates), verifiable digital signatures to electronic documents and images from remote client desktops or from mobile and web-enabled devices via a document viewer used across a secure cloud network. Authentication of the signing party is provided through multi-factor authentication options. In some embodiments, signed documents are ISO-32000 PDFs compliant with US OMB 'level 3' high trust certificates with encrypted digital signatures, which are verifiable by a third party in any ISO-32000 compliant PDF viewer. The system manages signing events and retrieves documents for signing from external systems. In some embodiments, high trust certificates are stored in a US NIST-certified FIPS-140 'level 3' HSM.

FIG. 1 is a block diagram illustrating an exemplary distributed computer system 100, according to certain embodiments. The system 100 includes one or more client computers 102, communications network(s) 104, and a Validation System 108. In some embodiments, communications network 104 is or includes the Internet. In some embodiments, Communication Network 104 is or includes a wired or wireless telephone network. In other embodiments, Communication Network 104 can be any local area network (LAN), wide area network (WAN), metropolitan area network, or a combination of such networks. Various embodiments of the Validation System 108 implement the methods obtaining high trust digital signatures described herein.

The client computers 102 can be any number of different types of computing devices (e.g., cell phones, personal digital assistants, gaming devices, desktop computers, laptop computers, tablet computers, handheld computers, Internet kiosks, or combinations thereof) that include a web browser running the Document Viewer client used to enable the activities described below. As will be described in detail below, some implementations require that client computers have the ability to send and receive SMS messages, while other implementations do not. Client computer(s) 102 are also referred to herein as client(s). A client 102 includes a user interface (UI) 400 (shown in FIG. 4) that is employed by a user of the client to interact with programs that execute on the client 102. In some embodiments, the UI 400 is a GUI. Client 102 is connected to the Validation System 108 via communications network(s) 104. As described in more detail below, the UI 400 is used to display scanned images of documents to be signed. The Validation System 108 provides mechanisms obtaining high trust digital signatures to users who access the Validation System 108 from the clients 102. The clients 102 are described in greater detail below with reference to FIG. 4.

The Validation System 108 includes a plurality of servers or components connected to communications network(s) 104. Optionally, the servers are connected to the communications network 104 via a front end server 110 (e.g., a server that conveys (and optionally parses) inbound requests to the appropriate server of the system 108 and that formats responses and/or other information being sent to clients in response to requests). The front end server 110, if present, may be a web server providing web-based access to the Validation System 108. The front end server 110, if present, may also be a router server that routes communications to and from other destinations, such as clients. In some embodiments, the front end server 110 is a third party developer application server, which allows a third party to control the look and feel of the client communications regarding obtaining high trust digital signatures utilizing the other server components of the Validation System 108. In some other embodiments, the third party application server, when present, is separate from the Validation System 108, and communicates with the other components of the Validation System 108.

The Validation System 108 also includes a DocViewer Server 112. The DocViewer Server 112 communicates with clients 102 via the front end server 110 (if present) and Communication Network(s) 104. In some embodiments, the DocViewer Server 112 is a web server that provides document management services using appropriate communication protocols. Alternatively, if the DocViewer Server 112 is used within an intranet or other LAN, it may be an intranet or LAN server. In some embodiments, the DocViewer Server 112 is configured to receive requests for content items to be signed and sends responses including signed items and related details. The signing party or user has a user profile which is stored on the DocViewer Server 112. At the time of signing, pre-enrolled users are authenticated by communicating with the DocViewer Server 112. In some embodiments, the signature requests received by the DocViewer Server 112 include a plurality of signer verification elements provided by the client 102. As will be explained in more detail below, the plurality of signer verification elements include, for example, a signer-specific password, a reason for signing, a signer's biometric information, and/or a one-time-use signer authentication code. The DocViewer Server 112 then communicates with the Signing Server 114, which verifies the verification elements and signs the documents. Then the DocViewer Server 112 provides a copy of the document to the client. In some embodiments, in addition to providing the signed copy of the document to the client, the DocViewer Server 112 also saves a copy of the signed document for future access and viewing. In some embodiments, the DocViewer Server 112 manages document workflow, signing events, signing plans (information on who signs a doc, where a doc is signed, and due dates), as well as signing party/user profile information. In one embodiment, the DocViewer Server 112 includes a document management system to store and manage documents on the DocViewer Server 112.

In some embodiments, the Validation System 108 also includes a Signing Server 114. The Signing Server 114 controls the provision of new high trust (US 'level 3') PKI x.509 digital certificates/Digital ID for document signing by a signer through a request from the DocViewer Server 112. In some embodiments, the Signing Server 114 also validates the Digital IDS, manages the Digital IDS (revokes, etc.), and signs the documents. In some embodiments, the Signing Server 114 also has an internal encrypted log for all signing events which can be used for reporting and auditing. In some embodiments, the Signing Server 114 receives the request for applying a high trust digital signature to a document from the DocViewer Server 112, along with the plurality of signer verification elements, and after obtaining validation of the plurality of signer verification elements, the Signing Server 114 embeds the high trust signature into the document.

In some embodiments, the Signing Server 114 verifies one or more of the signer verification elements by communicating with a HSM 116, which stores the high trust certificates, including their private keys. The Signing Server 114 creates a new Digital ID for the signer by creating and storing a private key and a certificate signing request on the HSM 116. In some embodiments, the HSM 116 stores information regarding the signer verification elements including a signer's password and/or a signer's biometric information and communicates with the Signing Server 114 to verify a plurality of the signer verification elements before a high trust signature is applied to a document.

The Signer's credentials are sent to Certificate Authority 118 for generation of a public certificate. The Certificate Authority 118 authenticates the signer's identity and issues a certificate that is chained to the Certificate Authority's root certificate, enabling authentication of a signer from any client application that supports certificate validation. The private key is stored on the HSM 116 for security under the control of both the DocViewer Server 112 and the Signer. In some embodiments, the Signing Server 114 verifies one or more of the signer verification elements by communicating with an external Certificate Authority 118, which issues verifiable digital certificates for users.

The components of the Validation System 108 communicate with each other by internal Communication Buses, or by any other appropriate mechanism or combination of mechanism. In some embodiments, the DocViewer Server 112 communicates with the Signing Server 114 via another server. For example, a Validation System 108 may include a separate server (not shown), and the DocViewer Server 112 may communicate with the Signing Server 114 via the other server. In some embodiments, one or more of the HSM 116 or the Certificate Authority 118 are located in a remote database server and the Validation System 108 has access to the remote database server (e.g., by Communication Network(s) 104).

In some embodiments, fewer and/or additional modules, functions, or databases are included in the Validation System 108. The modules shown in the Validation System 108 in FIG. 1 represent functions performed in certain embodiments.

Figure 2:
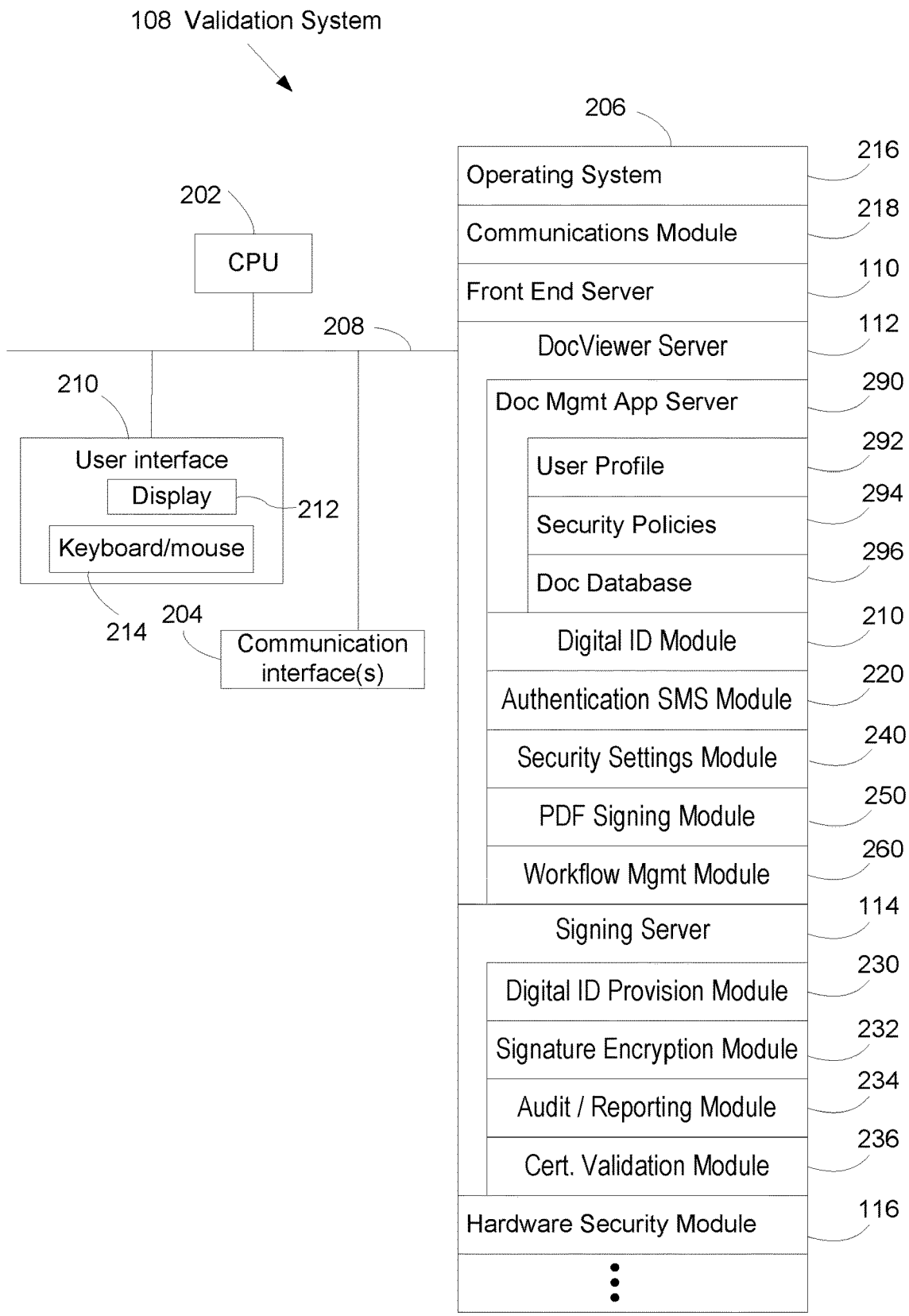
FIG. 2 is a block diagram illustrating a Validation System in accordance with some embodiments.

FIG. 2 is a block diagram illustrating the Validation System 108 in accordance with some embodiments. The Validation System 108 illustrated herein includes the (optional) Front End Server 110, the DocViewer Server 112, the Signing Server 114, and the HSM 116 illustrated in FIG. 1. The actual number of servers used to implement the Validation System 108 and how features are allocated among them will vary from one implementation to another, and may depend in part on the amount of data traffic that the system must handle during peak usage periods as well as during average usage periods, and may also depend on the amount of data stored by the Validation System 108. Moreover, one or more of the blocks in FIGS. 1 and 2 may be implemented on one or more servers designed to provide the described functionality.

Notwithstanding the discrete blocks in FIGS. 1 and 2, these figures are intended to be a functional description of some embodiments rather than a structural description of functional elements in the embodiments. The components can be implemented on one or more servers within the Validation System 108 or in one or more remote servers different from the Validation System 108. One of ordinary skill in the art will recognize that an actual implementation might have the functional elements grouped or split among various components. In practice, and as recognized by those of ordinary skill in the art, items shown separately could be combined and some items could be separated. For example, in some embodiments, the Signing Server 114 and the DocViewer Server 112 are implemented using one or more servers. Furthermore in some embodiments, HSM 116 is stored in a remote database server located outside the Validation System 108.

The Validation System 108 typically includes one or more processing units (CPUs) 202, one or more network or other communication interfaces 204, Memory 206, and one or more Communication Buses 208 for interconnecting these components. In some embodiments, Communication Buses 208 include circuitry (sometimes called a chipset) that interconnects and controls communications between system components. In some other embodiments, the Validation System 108 includes a user interface 210 (e.g., a user interface having a display device 212 and an input device 214 (e.g., a touch-sensitive screen, a keyboard, a mouse and/or other pointing/selection device).

Memory 206 of the Validation System 108 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within Memory 206, comprises a computer-readable storage medium. In some embodiments, the computer-readable storage medium includes a non-transitory computer-readable storage medium. In some embodiments, Memory 206 or the computer-readable storage medium of Memory 206 stores the following programs, modules and data structures, or a subset thereof:

- An Operating System 216 includes procedures for handling various basic system services and for performing hardware-dependent tasks.
- A Network Communication Module (or instructions) 218 is used for connecting the Validation System 108 to other computers (e.g., clients 102 and Certificate Authority 118) via the one or more Communication Network interfaces 204 and one or more communications networks 104 (FIG. 1), such as the Internet, other wide area networks, local area networks, metropolitan area networks, and so on.
- A Front End Server 110 conveys inbound requests to the appropriate server of the system 108 and that server formats responses and/or other information being sent to clients in response to requests.
- A DocView Server 112 processes workflows and associated requests for content items to be signed and sends responses including signed items and related details. The DocViewer Server 112 utilizes a document management application server 290, which stores documents and document view information for access by desktop, web or mobile clients 102. The document management server 290 uses a document database 296 to store documents and document views for retrieval, viewing, and display by the clients 102. The document management server 290 contains shared signer/user profiles 292 and security policies 294. The DocViewer Server 200 has modules including a Digital IDs/certificate module 210, a Signer Verification/Authentication SMS module 220, a user security settings and policies module 240, a PDF creation and signing module 250, a workflow management module 260, and getting/putting documents in the Document Management Server 290.
- A Signing Server 114 provisions new Signers and completes cloud or server-side signing requests. In some embodiments, the Signing Server 114 is connected to the DocViewer Server 112 via a secure VPN network, which enables the Signing Server to be securely placed on a cloud network behind a firewall. In other embodiments it is on an internal network directly connected to the DocViewer Server 200 without a VPN. The Signing Server 114 has modules including a Digital ID provisioning module 230—for supplying new Signer credentials, creating a private key on the HSM 116 and requesting a valid x.509 ID certificate from the Certificate Authority 118; a Doc Signature EncryptionDoc module 232—which uses a supplied hash of the document to be signed (provided by the DocViewer Server) and signs it with the user's private key which is stored in the HSM 116 using ISO 32000 standard PDF x.509 digital signing methods; an Audit Trail/Reporting module 234—which for each signing event, writes a time stamped record of the signer, document signed, IP address of signer and other audit trail details in an encrypted, non-alterable log and provides export and reporting of this log for administrators; and a Certificate Validation/Revocation Module 236 which provides validation of a Signer's Digital ID based upon requests from DocViewer Server 200 and provides revocation of a Signer's Digital ID as needed based on security or other policies.
- A HSM 116 stores the high trust certificates, including their private keys and in some embodiments also stores information regarding the signer verification elements including the signer's biometric information.

One of the benefits some embodiments described herein is that the validation system 108 is cloud based. This allows for a document to be signed with a high trust digital signature from a mobile device or another device that is not necessarily within a local firewall system. This cloud based system allows for documents to be passes outside of individual protected networks and shared between organizations while still maintaining a high level of trust in the applied digital signatures.

The user security settings module 240 provides for the secure collection and storage of user information and user profile preferences such as signature appearance and method of receiving notifications (email, SMS). In accordance with some embodiments, administrators can define the documents and services that users can access, and can define document views that users can access and view. In some embodiments, a variety of settings such as security settings that enable the application to be US FDA compliant for digital signing under US 21 CFR Part 11 are included in this set of application services.

The PDF document signing module 250 provides for digital document signing using iText, a well-known PDF library for manipulating PDF files. This service also provides for the conversion of MS office documents and images to PDF format.

Figure 11:
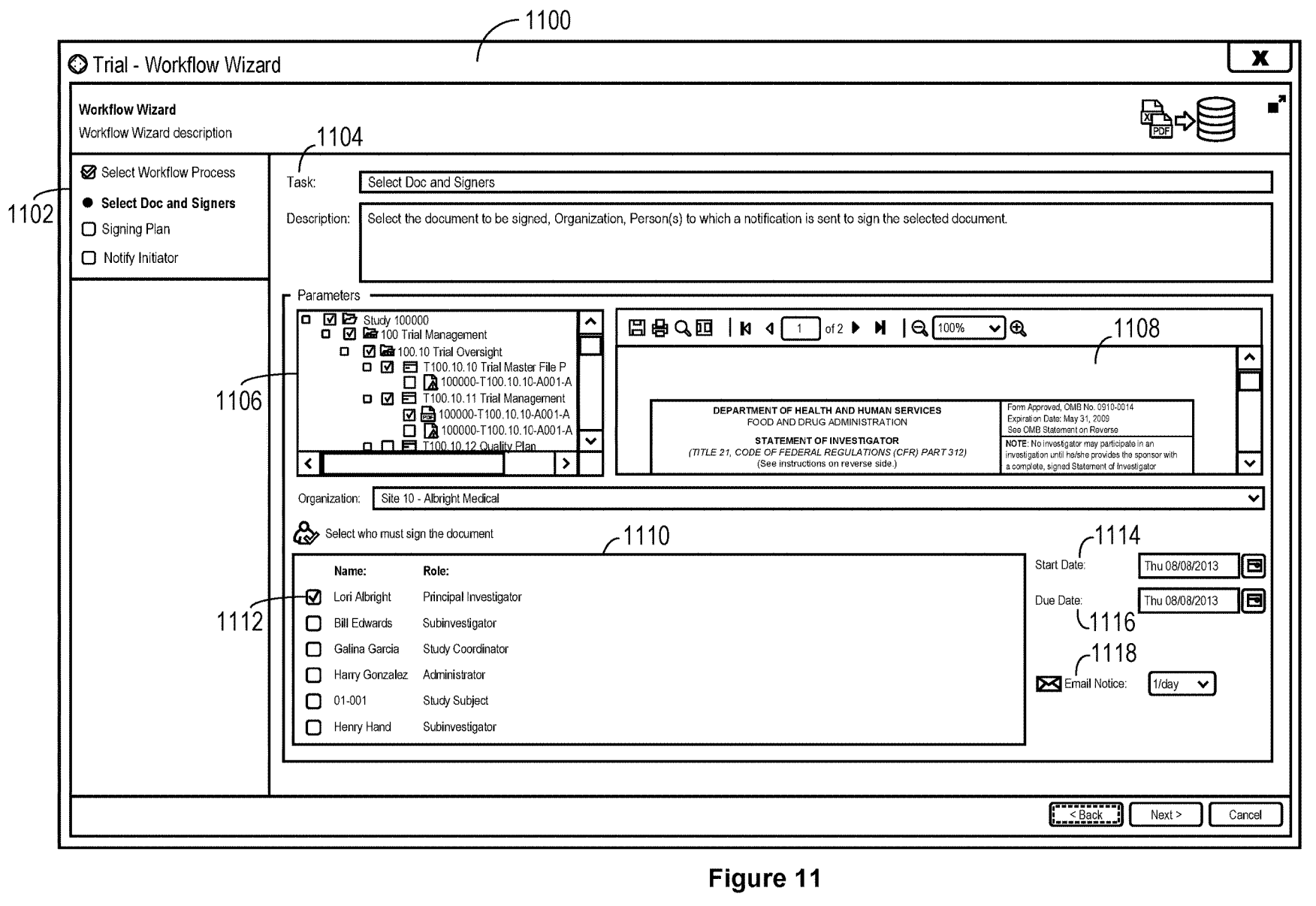
Figure 12:
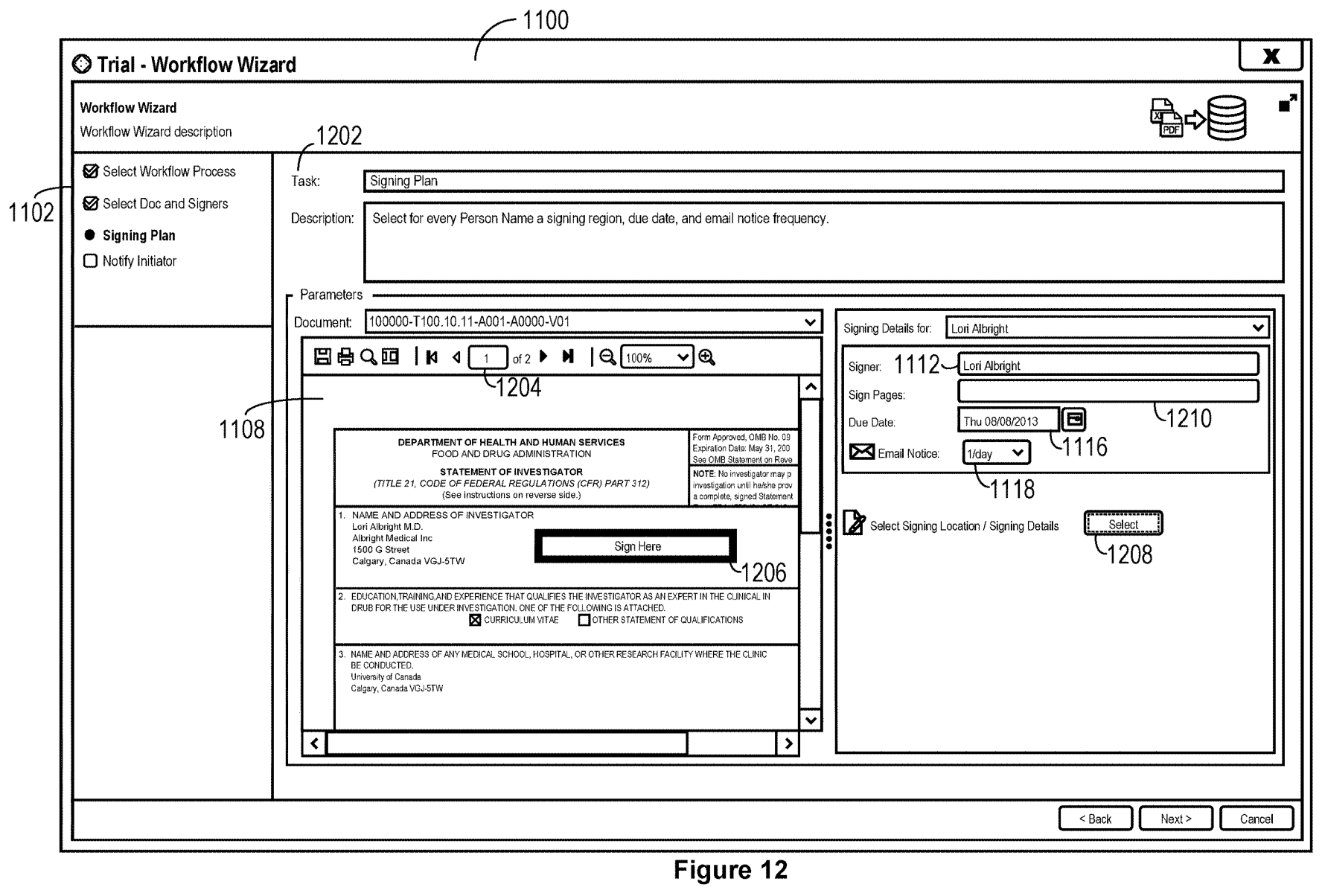

The workflow manager 260 utilizes a workflow wizard that enables predefined business processes to be created. These predefined processes can be modified using the workflow wizard screenshots, which are illustrated in FIGS. 11 and 12. For example, the process "Upload and Sign document" is a predefined process that is defined by utilizing the workflow manager 260. The workflow manager 260 specifies details of how the process will be completed, such as where the document(s) is located that will be signed, as well as a "Signing Plan" which specifies details such as who will sign the document(s), where the signer will sign on the page, and additional information that is needed for signing such as metadata, due date for signature, and notifications that will be sent after signing. These details are stored on the DocViewer Server 112 and are used during the signing process.

Each of the above-identified modules and applications corresponds to a set of instructions for performing one or more functions described herein. These modules (i.e., sets of instructions) need not be implemented as separate software programs, procedures, or modules, and thus various subsets of these modules may be combined or otherwise re-arranged in various embodiments. In some embodiments, Memory 206 may store a subset of the modules and data structures identified above. Furthermore, Memory 206 may store additional modules and data structures not described above.

Figure 3A:
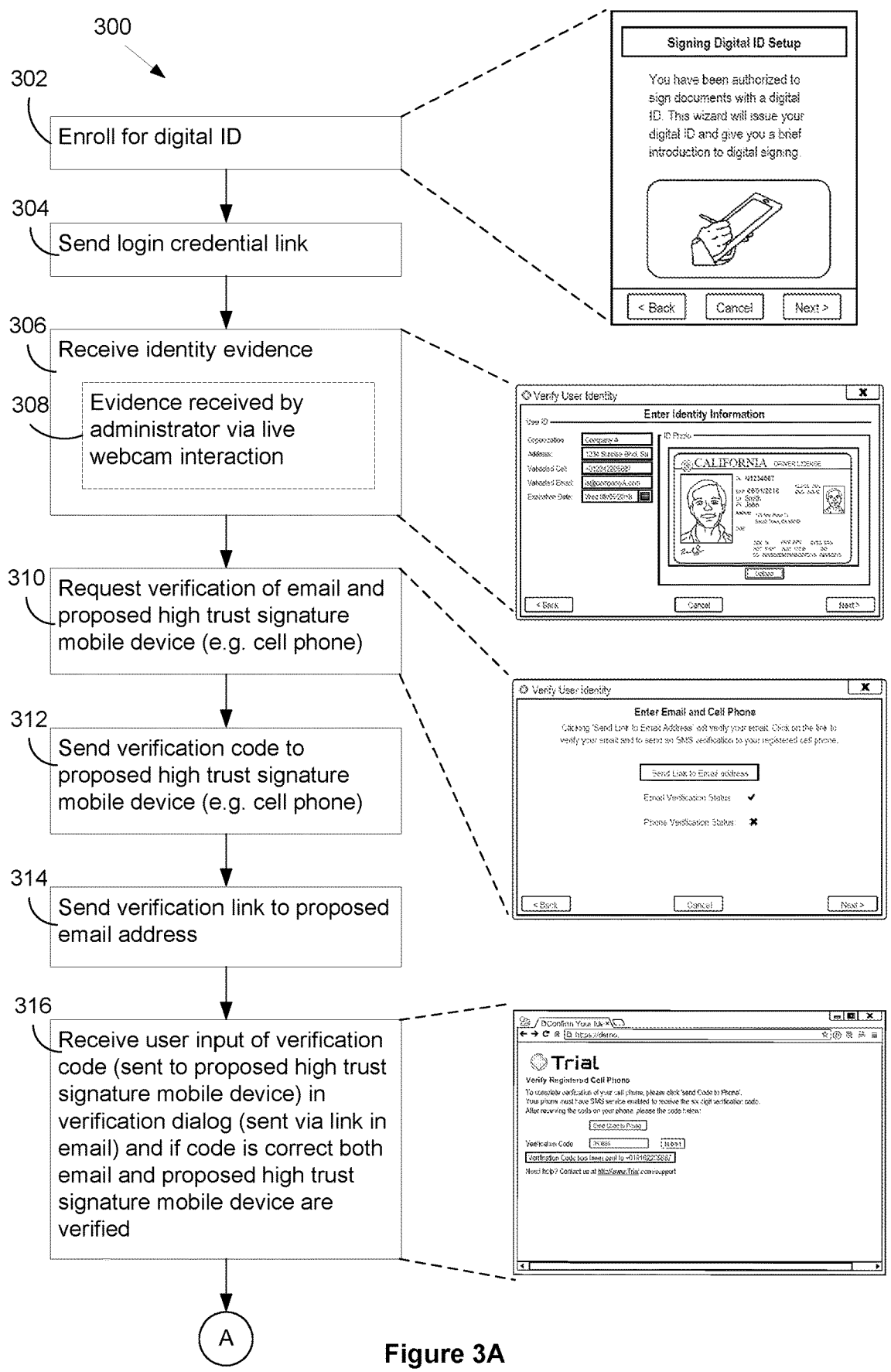
FIGS. 3A and 3B illustrates a process of issuing a Digital ID performed by the Digital ID module in accordance with some embodiments.

FIG. 3A illustrates a process of issuing a Digital ID performed by the Digital ID module. First, new users are enrolled for a Digital ID 302. Enrolling is done by creating or importing a user's profile on the system and designating details of the user's credentials including mobile phone, email, name, role, etc. In some embodiments, enrolling is done by the administrator through an import wizard on the server. In other embodiments, enrolling is done through an automated registration form completed by the prospective user. The DocViewer Server 200 interacts with the user to capture and validate evidence of identity including: the user's government photo ID, email, and mobile device identification details.

Users who have been approved for issuance of a new Digital ID are then sent an email link with login credentials 304. After receipt of the login credentials, the user clicks on a link to download the application and/or signs-in to the DocViewer client application (desktop or mobile). After the user has successfully signed in with their new login credentials as in step 304, the user is required to provides evidence of their identity such as their government photo ID 306. In one embodiment, the user simply takes a photo of their photo ID from their mobile phone or computer's webcam, and this image is uploaded to the validation system of FIG. 2. In another embodiment, the user may be required to show their photo ID along with their physical image simultaneously to the administrator through a live webcam link 308. In these embodiments, the administrator captures the user's Photo ID image through the webcam to the validation system. This provides a mechanism of highly trusted signer identification when issuing high trust digital signature IDs to be used in cloud based digital signature systems.

After the evidence of the user's identity is uploaded at 306, the user may be required to provide evidence of email and a valid cell phone number 310. In some embodiments, the user can verify these two items in a single user transaction. The proposed high trust signature mobile device (e.g. the user's cell phone) is sent a verification code 312. The user is also mailed a URL with a link to a web page 314. Then the user utilized the URL open a dialog where the user enters a received verification code, as illustrated with respect to 316.

Figure 3B:
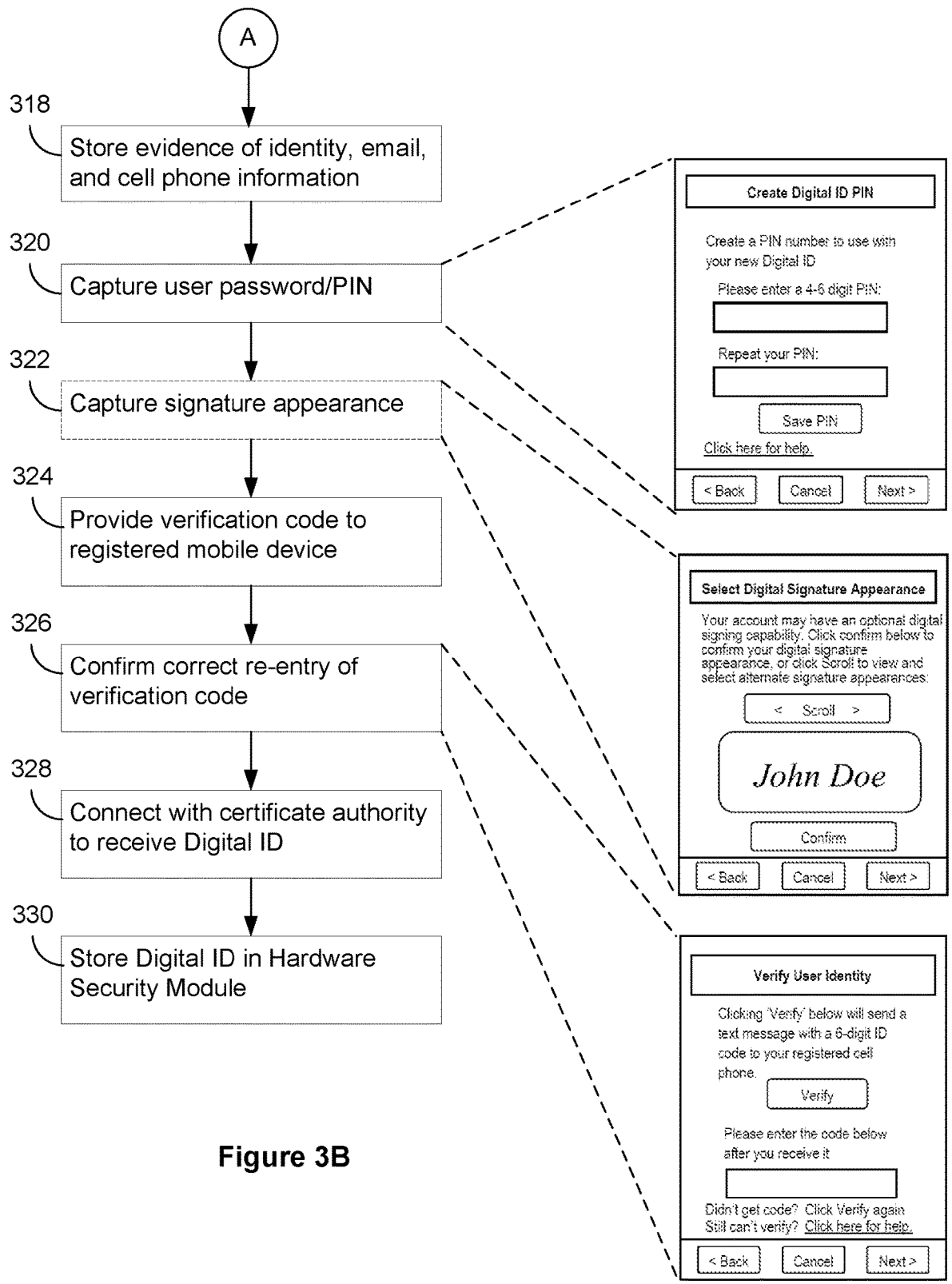

The process continues with FIG. 3B. After the user successfully enters the validation code, the evidence of identity, evidence of email and evidence of cell phone number is captured in the validation system and also is later sent to the Registration Authority or Certificate Authority for issuance of a new Digital ID 318.

The DocViewer Server 200 then interacts with the user on the DocViewer client 100 to capture the user's preferred Digital ID PIN code 320. In some embodiments, the user also (optionally) selects a signature appearance 322. Then an SMS with a verification code is sent to the user's registered mobile device to verify the user, and the user must enter the verification code to proceed with Digital ID provisioning 324. Once entered the code is verified 326, and the Signing Server 114 makes a connection to the Certificate Authority 118 to issue a new Digital ID to the user 328. The new digital ID is then stored 330 in the HSM 116.

Figure 4:
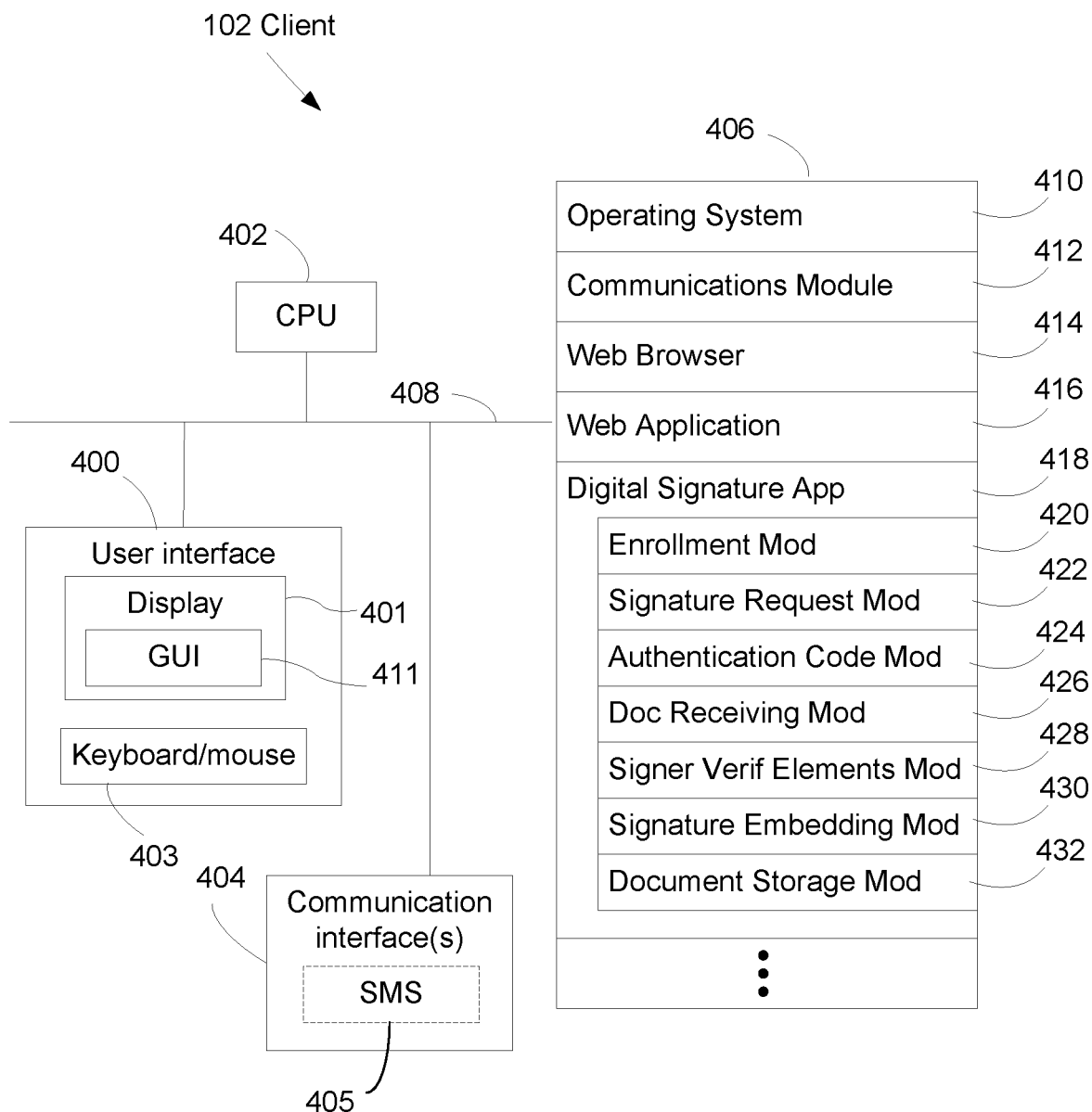
FIG. 4 is a block diagram illustrating a client in accordance with some embodiments.

FIG. 4 is a block diagram illustrating a client, also called client systems or client devices in accordance with some embodiments. Clients 102 as shown in FIGS. 1 and 4 are configured for use by a user of the validation system 108. The client 102 includes a user interface 400, which typically includes a display device 401 and one or more input devices 403, such as a keyboard and a mouse or other pointing device. The client 102 includes the graphical user interface (GUI) 411, which is displayed on display device 401. A client 102 typically includes one or more processing units (CPUs) 402, one or more network or other network communications interfaces 404 (including SMS 405 in some embodiments), memory 406, and one or more communication buses 408 for interconnecting these components. Communication buses 408 may include circuitry (sometimes called a chipset) that interconnects and controls communications between system components.

Memory 406 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternately the non-volatile memory device(s) within memory 406, comprises a computer readable storage medium. In some embodiments, the computer readable storage medium includes a non-transitory computer readable storage medium. In some embodiments, memory 406 or the computer readable storage medium of memory 406 stores the following programs, modules, and data structures, or a subset thereof:

- an Operating System 410 that includes procedures for handling various basic system services and for performing hardware dependent tasks;
- a Network Communication Module (or instructions) 412 that is used for connecting client 102 to other systems (e.g., the validation system 108) via the one or more communications Network Interfaces 404 (wired or wireless depending on whether the client is a mobile or desktop device) and one or more communication networks 104 (FIG. 1), such as the Internet, other wide area networks, local area networks, metropolitan area networks, telephone, and SMS networks, and so on;
- Applications including a web browser 414;
- A Digital Signature Application 418, which may be a web application or a separate application stored on the client device. The Digital Signature Application 416 may be based on Active X, Java script, Java applet, Ajax, Comet, or any other programming languages and tools. In some embodiments, the Digital Signature Application 416 includes one or more of the following modules, or a subset or superset thereof:
    - An Enrollment Module 420 used in provisioning new user accounts including capturing a user specific password/PIN as well as other user information (including a mobile phone number used in some embodiments for receiving onetime signer authentication codes) and confirming;
    - A Signature Request Module 422 for receiving and displaying messages from the validation system 108 indicating that a document requires a user's signature;
    - An Authentication Code Module 424, for receiving a onetime signer authentication code, and in some embodiments, automatically applying/populating the code in a signing dialog window (e.g., 856, FIG. 8) as one of the plurality of signer verification elements. It is noted that the authentication code module is a used specifically in client devices that are provisioned to be a high trust signature mobile device and thus have the capability to receive SMS messages or the like.
    - A Document Receiving Module 426 that is used for receiving and displaying electronic documents that require high trust digital signatures;

A Signer Verification Elements Module 428 for receiving a plurality of signer verification elements such as the user's Digital ID, Verification Code, Reason for Signing, and Onetime Signer Authentication Code (which is automatically received and applied from the Authentication Code Module 424 in certain embodiment). The Signer Verification Elements Module 428 also provides the plurality of signer verification elements as a reply to the signature request. The plurality of signer verification elements are sent to the validation system 108.

An optional Signature Embedding Module 430, which upon obtaining validation for the plurality of signer verification elements from the validation system embeds a high trust digital signature of the signer into the document (e.g., by and utilizing the signer's private key using ISO 32000 standard PDF x.509 digital signing methods) and provides a copy of the signed document to the validation system 108; and An optional Document Storage module 432, which stores a local copy of the signed document (which is encrypted in some embodiments), and optionally also stores a log of each signing event, including a time stamped record of the signer, document signed, IP address of signer and other audit trail details.

It is noted that in some embodiments, programs embedded within the Digital Signature Application 418 format documents and document information for display. In some embodiments, the client 102 displays data received documents and messages from the validation system 108 based on conventional means for exchanging data, without using webpages. For example, a client 102 can display documents received from the validation system 108 without using webpages. In some embodiments, the client 102 receives the documents based on conventional means (e.g., as a non-webpage electronic document, such as a portable document format (PDF) file, or an image file (e.g., a TIFF or JPEG)) and displays at least a portion of the documents and document information as a webpage in the web browser 414. In other embodiments, a client 102 receives documents, messages, and information as webpages, and displays the received webpages using the web browser 414.

In other embodiments the client 102 is a "thin client," that includes a web browser 414 that executes the Digital Signature Application 418, and the client 102 does not need, nor does it use, a locally installed software application. In other embodiments, the client 102 includes a document management application (not shown) that performs functions analogous to the functions of the Digital Signature Application 418 as an independent application (i.e., operates without the web browser 318). In some cases, the client 102 includes both a web app and a separate application, each of which performs one or more functions or analogous functions of the Digital Signature Application 418 described herein.

Figure 5:
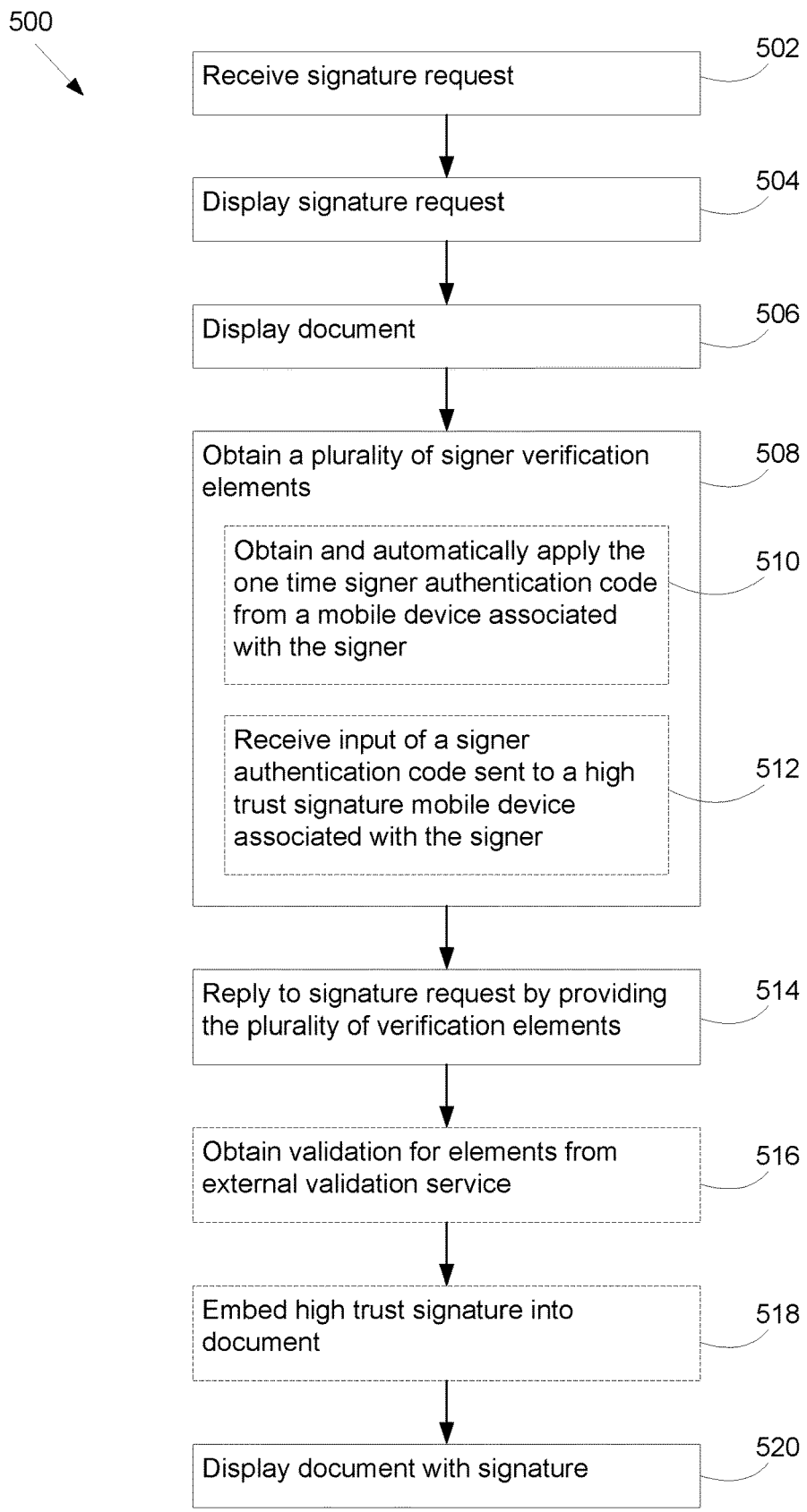
FIG. 5 is a flowchart representing a client method of obtaining a high trust digital signature on an electronic document in accordance with some embodiments.

FIG. 5 is a flowchart representing a method 500 of obtaining a high trust digital signature on an electronic document in accordance with some embodiments. The computer-implemented method 500 is performed at a client 102 having one or more processors and memory storing one or more programs for execution by the one or more processors to perform the method. In some embodiments, the client 102 is a high trust signature mobile device, capable of receiving SMS messages and which is associated with a signer that is pre-enrolled with the validation server system 108. In other embodiments, the client 108 is a desktop device or other device which does not directly receive SMS messages, and/or is not associated with a signer that is pre-enrolled with the validation server system 108. Depending on the nature of the client 102, the process of obtaining a high trust signature on an electronic document is different, as explained below.

The client 102 receives a signature request 502 for an electronic document that requires a high trust digital signature. When the client 102 is a at a high trust signature mobile device, the signature request includes a one-time signer authentication code. When the client 102 is not at high trust signature mobile device, the request does not include the one-time signer authentication code. Instead, the one-time signer authentication code is sent separately to a high trust signature mobile device later in the process, as explained below. In some embodiments, either or both an email signature request and an SMS signature message are sent to the user notifying him or her that he or she has a document that needs to be signed. As such, the received signature request can be either an email or an SMS message.

The client displays the signature request 504 on its graphical user interface notifying the user that he or she has a document that needs to be signed. The notification allows the user to launch the signature process through, for instance a selection of a launch button or a link to the DocViewer Server 112 (e.g., FIG. 7, 720). In some embodiments, the one-time signer authentication code is included in the link (e.g., FIG. 7, "sureEsign/login%3f123456" where the one-time signer authentication code 756 is the link portion "123456"). In some embodiments, the SMS message includes a 'tiny URL' which is a coded representation that includes the six-digit authentication code element as well as a pointer link to the URL to view and sign the document.

Figure 9:
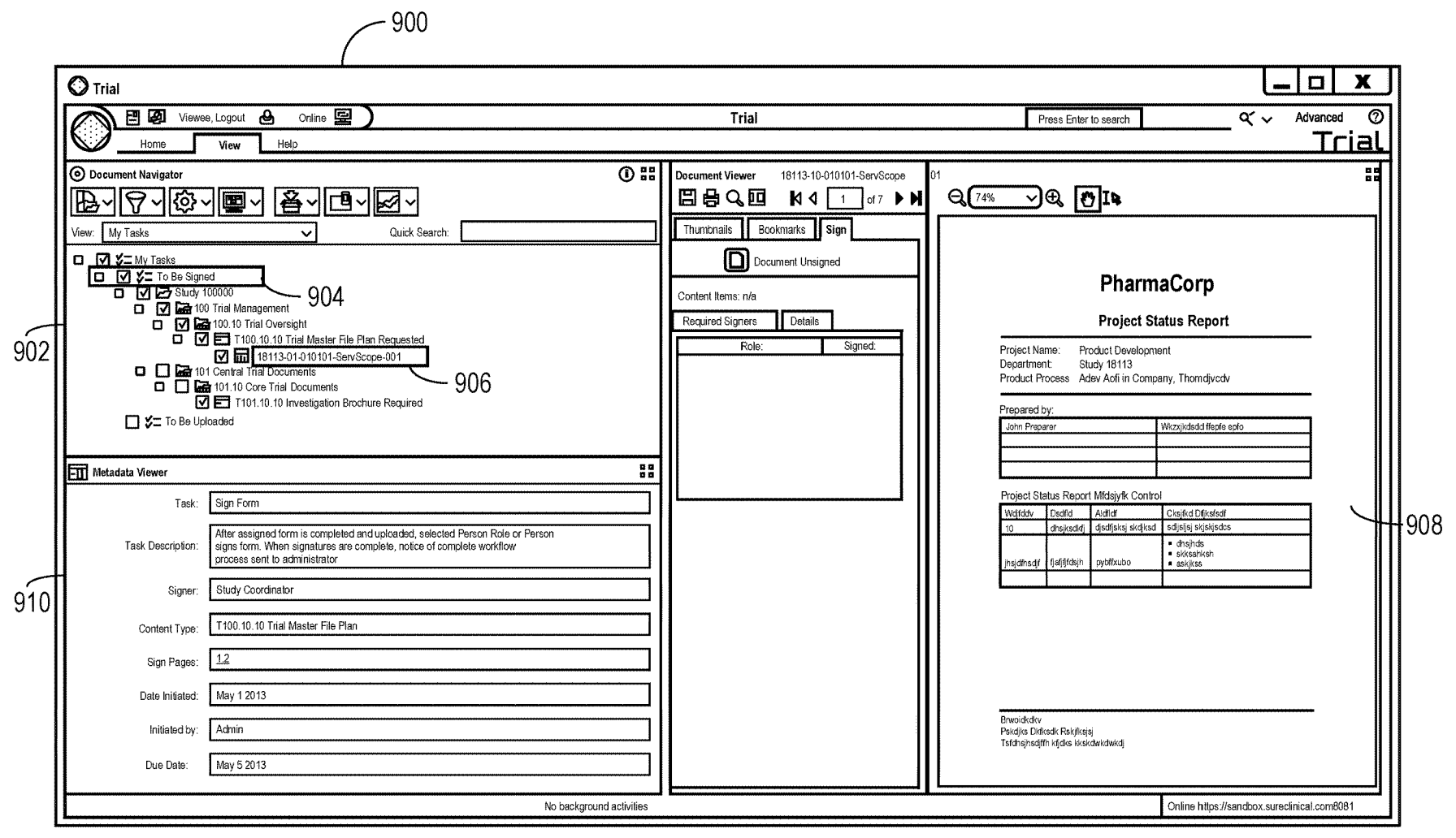

In response to a user selection, the signing application is launched and the client displays the document that requires the high trust digital signature 506. In some embodiments, the client 108 sends a request for the document to the Validation System 108 in response to receiving the user selection of the signature request; and after the client 102 receives the document from the Validation System, it then displays the document 506. For instance, in some embodiments, prior to displaying the document, users are prompted to enter their username/password to log in to the viewer application in which to view the document. In some embodiments users are then presented with a 'task summary' dialog box 902 indicating that they have a document that needs to be reviewed and signed as illustrated in FIG. 9, 904. For instance, as illustrated in FIG. 9, the user is allowed to navigate within the signing application 900 to view documents to be signed, and when the user clicks on the document to be signed 902, the document is obtained from the Validation System 108 and presented in a document viewer window 904 for viewing 506.

In other embodiments, to review and sign a document the user clicks on the document name or on a dialog box link to launch and view the document in the document viewer but is not required to navigate through the signing application windows illustrated in FIG. 9. In some embodiments, the user selects a link within the signature request which activates the display of the document in a separate document viewer window.

In other embodiments, a copy of the document is sent from the Validation System 108 to the client 102 without requiring the client to explicitly request it (e.g., it is embedded with the signature request, is sent shortly thereafter, or is pre-fetched when the user hovers over or otherwise indicates that a selection of the signature request is likely). As such, in these embodiments, the lag time between selection of the signature request and display of the document is eliminated or minimized. This may be especially advantageous when the document is large or contains numerous images.

One advantage of displaying the document on the client device is that the signer sees precisely what he is signing. This allows the signer to verify that the document to be signed contains accurate information or is otherwise correct and worthy of receiving the signer's high trust digital signature. After viewing the document in the Doc Viewer and when ready to sign, the user launches the signing process. For instance, in some embodiments, users click the Sign icon in the document viewer.

Figure 7:
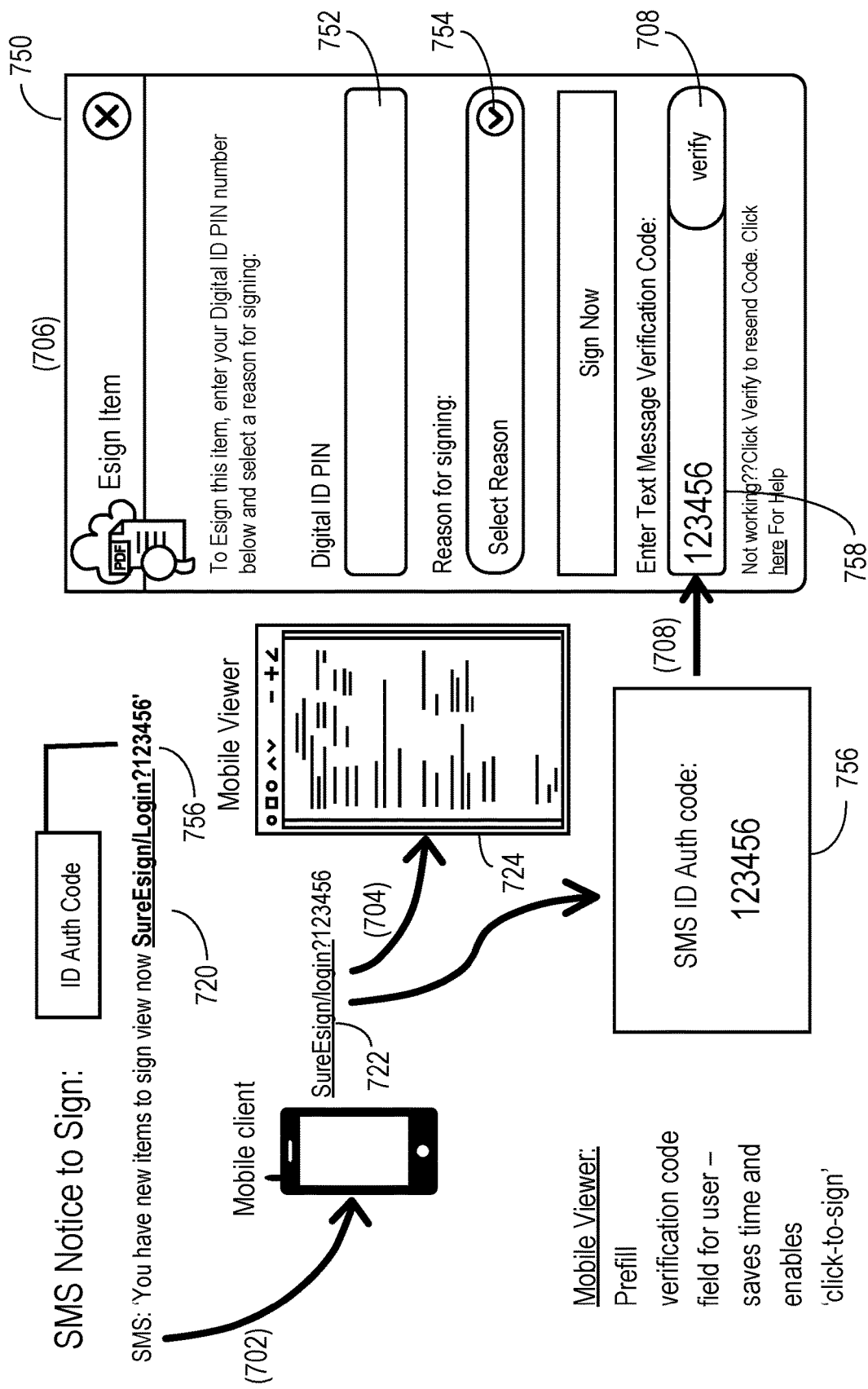
FIG. 7 illustrates an exemplary process for verifying a signer utilizing a one-time signer authentication code received via SMS and other signer verification elements in accordance with some embodiments.
Figure 8:
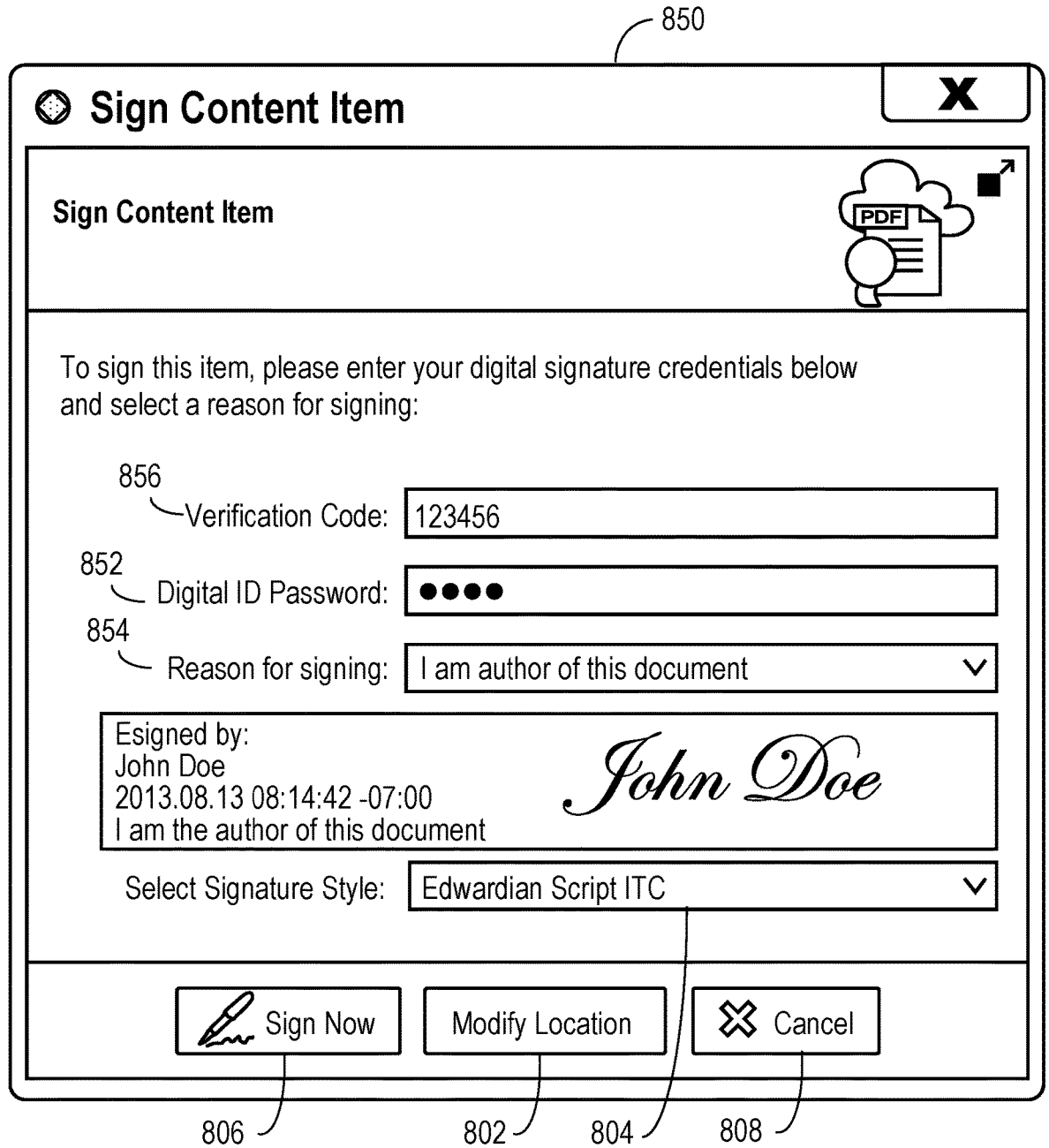
FIG. 8 provides an exemplary illustration of a user interface for providing a plurality of signer verification elements in a dialog window in accordance with some embodiments.

Then multiple signer verification elements are obtained 508. Obtaining various signer verification elements is illustrated in FIGS. 7's signing dialog window 750 and FIG. 8's signing dialog window 850. In some embodiments, one signer verification element is a signer-specific password (FIG. 7, element 752; FIG. 8, element 852). A password is any collection of numbers or letters. For instance, it may be a personal identification number (e.g., Digital ID PIN). The password is associated with the signer and is verifiable because the signer has pre-enrolled with the validation server system 108, as explain with respect to FIG. 3. The password is obtained by the signer entering it. Another signer verification element is a signer's reason for signing (FIG. 7, element 754; FIG. 8, element 854). For instance, some pharmaceutical clinical trials require that the signer provide a reason for signing, stating that he or she is the author, a reviewer (e.g. the official reviewer, or a certified practitioner), or the like. In some embodiments, reasons for signing are selected from a drop-down menu of options. In other embodiments, the user types the reason for signing. It is noted that not all embodiments require a signer's reason for signing as one of the signer verification elements. Similarly, in some embodiments another signer verification element is a signer's biometric information. Biometric information includes any of the following: fingerprints, retina scans, facial recognition or similar US NIST approved biometric identification factors. In some embodiments, the signer specifies where in the document to apply the signature (see, e.g., "modify location" 802 in FIG. 8). In some embodiments, the signer is also allowed to choose a signature style (see, e.g., "select signature style" 804 in FIG. 8.)

In all embodiments, one of the signer verification elements is a one-time signer authentication code (FIG. 7, element 756; FIG. 8, element 856). In some embodiments, the one-time signer authentication code is a randomly generated six-digit number or code (including numbers, letters and/or symbols etc) which is sent to the signer's high trust signature mobile device by SMS. In other embodiments, the one-time signer authentication code is longer and/or contains a collection of numbers, letters, and symbols sent to the signer's high trust signature mobile device through SMS or another messaging application. In some embodiments, the one-time signer authentication code is used only for signing the document associated with the signature request, and cannot be used to sign another document. In other embodiments, the one-time signer authentication code is used only for signing during an individual signing session, but can be used for multiple documents signed in a single session. In other words, when the user is logged in to the signature application, the plurality of signer verification elements can be obtained and used for the signing of multiple documents within a single log-in session. One advantage of utilizing a one-time signer authentication code as a signer verification element is that it allows the eventually applied digital signature to be highly trusted because the one-time digital signer authentication code is only sent to a high trust signature mobile device associated with the signer who has pre-enrolled and already been verified by the validation server.

In some embodiments, the one-time signer authentication code obtained from the signature request is automatically applied 510. This occurs in embodiments where the client 102 is a high trust signature mobile device, capable of receiving SMS messages (or the like) and which is associated with a signer who is pre-enrolled with the validation server system 108. As such, the signature request is included in the one-time signer authentication code. Because the one-time signer authentication code was included in the original signature request it is automatically populated in a field associated with the one-time signer authentication code. For instance, as illustrated in FIG. 7, the SMS message "sureEsign/login?123456" 720 included the one-time authentication code element "123456" 756, which is then automatically populated into the field 758 associated with the one-time signer authentication code). It is noted that in some embodiments, the message includes a 'tiny URL' which is a coded representation that includes the six-digit authentication code element as well as a pointer link to the URL to view and sign the document. Thus, the signer is saved the trouble of retyping the code when he is already using his high trust signature mobile device to view and sign the document.

In other embodiments, the one-time signer authentication code is obtained from the signer inputting it after receiving it from a high trust signature mobile device 512. This occurs in embodiments where the client 102 is not a high trust signature mobile device, and thus did not receive the one-time signer authentication code. In some embodiments, the client is instead a desktop device or other device which does not directly receive SMS messages, and/or is not associated with a signer who is pre-enrolled with the validation server system 108. As such, the signature request received at 502 did not include the one-time signer authentication code. Instead, the one-time signer authentication code was separately sent to the high trust signature mobile device. As will be explained in more detail with respect to FIG. 6, the separate message containing the one-time signer authentication code is provided from the Validation System 108 to the high trust signature mobile device either simultaneously with or subsequent to sending the signature request to the client. For instance, in some embodiments, the separate message containing the one-time signer authentication code is provided to the high trust signature mobile device in response to the signer selecting a link in the signature request and/or requesting a copy of the document for display at 506. In any event, at 512 the signer obtains the one-time signer authentication code from his high trust signature mobile device and then types it into a field associated with the one-time signer authentication code.

After a plurality of signer verification elements are obtained, the client 102 replies to the signature request by providing them to the Validation System 514. For instance, as illustrated in FIG. 8, the user selects the "sign now" option 806. Then the Validation System 108 validates the plurality of signer verification elements as explained with respect to FIG. 6.

In some embodiments, the client then applies the high trust digital signature to the document. In these embodiments, the client obtains validation for the plurality of signer verification elements from the Validation System 516. Then upon obtaining validation, the client embeds the high trust signature into the document 518. For instance, the client may embed the high trust signature into the document by utilizing an encrypted key received from the Validation System 108. In some embodiments, the client then sends a copy of the document with the embedded signature back to the Validation System, which stores a copy of the signed document.

In some embodiments, the Validation System 108 applies the high trust digital signature to the document (e.g., via encrypted key) and then saves it. In these embodiments, the Validation System 108 then sends a copy of the document with the high trust digital signature applied to the client 102.

Then the client 102 displays a copy of the document with the high trust digital signature applied on its display device 520. As such, the signer gets visual confirmation that his or her signature has been applied to the document.

Figure 6:
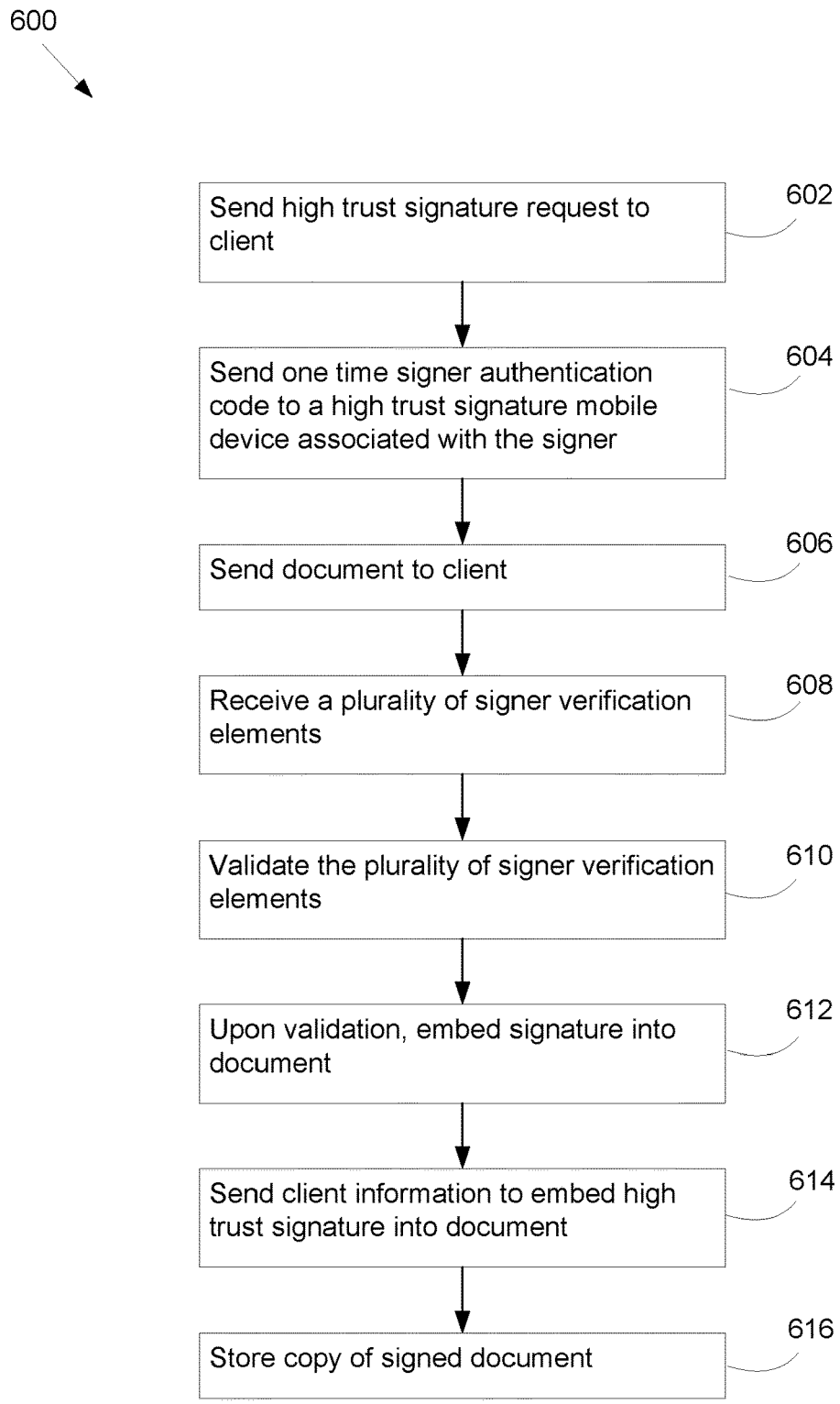
FIG. 6 is a server method of obtaining a high trust digital signature on an electronic document in accordance with some embodiments.

FIG. 6 is a flowchart representing a method 600 of obtaining a high trust digital signature on an electronic document in accordance with some embodiments. The computer-implemented method 600 is performed at a validation server system 108 having one or more processors and memory storing one or more programs for execution by the one or more processors to perform the method. In some embodiments, the Validation System 108 includes an (optional) Front End Server 110, a DocViewer Server 112, a Signing Server 114, and a HSM 116 illustrated in FIGS. 1 and 2.

The validation server system 108 sends to a client 102 a signature request regarding a document that requires a high trust digital signature 602. The validation server system 108 also generates and sends a one-time signer authentication code to a high trust signature mobile device 604. The one-time signer authentication code is a randomly generated code associated only with the signer and only for a limited purpose (e.g., to sign a particular document). In some embodiments, when the client 102 is a at a high trust signature mobile device, the signature request includes a one-time signer authentication code. In some embodiments, when the client 102 is not a high trust signature mobile device, the request does not include the one-time signer authentication code. Instead, the one-time signer authentication code is sent separately to the high trust signature mobile device.

It is further noted that in embodiments where the one-time signer authentication code is not included in the signature request, the one-time signer authentication code can be sent at a variety of times 604. In some embodiments, the one-time signer authentication code is sent to the high trust signature mobile device simultaneously with the signature request being sent to a separate client device. In other embodiments, it is sent in response to the user launching a signature application (e.g., by selecting a link or button within the signature request.)

The validation server system 108 sends to a client 102 the document that requires the high trust digital signature 606. As explained with reference to FIG. 5, in some embodiments, the document is sent in response to the client's 108 request for it. For instance, in some embodiments, after the user logs in to a viewer application, the user selects a link within the signature request which activates the request for the document. In other embodiments, a copy of the document is sent from the Validation System 108 to the client 102 without requiring the client to request it. For instance, as explained with respect to FIG. 5, a document is embedded with the signature request, is sent shortly thereafter, or is pre-fetched when the user hovers over or otherwise indicates that a selection of the signature request is likely, in accordance with various embodiments. In some embodiments, for added security, the validation server system 108 only provides the document in a document viewer window 904 within a signing application, e.g., after the user has opened and logged in to a signing application and has selected a document to be signed 902. It is noted that in most embodiments, documents to be signed are non-editable, such that they can only be viewed by the client but cannot have their contents modified (except to add a signature as explained herein.)

The validation server system 108 obtains a plurality of signer verification elements from the client. As explained with respect to FIG. 5, the signer verification elements include: a signer-specific password (FIG. 7, element 752), a signer's reason for signing (FIG. 7, element 754), a signer's biometric information, and a one-time signer authentication code (FIG. 7, element 756). The one-time signer authentication code is the code sent by the validation server system to the high trust signature mobile device associated with the signer at 604. In some embodiments, included with the signer verification elements are other details such as a signer-specific signature location and/or signature style (see FIG. 8, elements 802 and 804).

The validation server system then validates the plurality of signer verification elements (610). As explained with respect to FIG. 2, the HSM 116 stores the high trust certificates, including their private keys and in some embodiments also stores information regarding the signer verification elements including a signer's biometric information. As such, the plurality of signer verification elements are at least partially verified by checking the information stored in the HSM 116. For instance, in some embodiments the user's Digital ID is validated on the Signing Server 114 and compared against the published CA x.509 certificate for validation. In the case of biometric verification, in some embodiments, an external biometric verification service is also used to verify that the biometric element is associated with the signer. Furthermore, the one-time signer authentication code provided is verified by checking that it matches the random code generated by the validation server system and previously sent to the high trust mobile device associated with the signer.

In some embodiments, the Validation System then applies the high trust digital signature to the document. In these embodiments, the Validation System obtains validation for the plurality of signer verification elements and upon obtaining validation, the Validation System then embeds the high trust signature into the document 612. Specifically, after the verification elements are validated, the document viewer's PDF creation and sign service 250 is used to embed the user's Digital ID and hash (also known as a digest) into the document. For instance, the high trust signature is embedded into the document by utilizing an encrypted key. In some embodiments, the Digital ID uses an x.509 Public-key cryptography certificate form which contains the user's private key certificate and a secret PIN code/password for digitally signing documents. In some embodiments, a copy of the document with the embedded signature is then sent to the client.

In other embodiments, the client applies the high trust digital signature to the document. In these embodiments, after the Validation System validates for the plurality of signer verification elements, it sends the client a message that the signer has been verified and sends information necessary to embed the high trust signature into the document 614. For instance, the client may embed the high trust signature into the document by utilizing an encrypted key and a hash of the document provided by the Validation System 108. In some embodiments, the client then sends a copy of the document with the embedded signature back to the Validation System.

Finally, the Validation System stores a copy of the signed document 616. A time stamped record of the signer, the document, the IP address of the signer, and other audit trail details are stored in an encrypted, non-alterable log. As such, the log can be provided for export and reporting purposes.

It is noted that in some embodiments, a user/signer is able to digitally sign a document using digital signature, whereby the user can sign a document he has uploaded himself. In other words, it is a mechanism for allowing a user to sign a document without first receiving a signature request. In these embodiments the user may also select a place on document where the signature block will appear. In these embodiments, first, user uploads a document to the validation system 108. Documents and images may be uploaded. When documents are uploaded, they are converted on the validation system 108 to a PDF document. When images are uploaded, they are compressed either locally or on the server and then converted to a PDF document. The user can view the document in the document viewer after uploading. If the user has sufficient privileges (e.g. a signature account with a PIN and an associated high trust mobile device), they can now sign the document. The user clicks 'Sign' icon and a signing dialog is presented. In some embodiments, the user is prompted with a dialog to click on the screen where they wish the signature to be placed (analogous to the illustration in FIG. 12, 1206). In some embodiments, the user can either cancel this dialog and 'click to sign' the document in the default location (set by admin, usually last page, lower right corner), or they can manually select a signing location. If the user selects 'select signing location' the signature block appears on the document in the document viewer—as illustrated in FIG. 12. The user can drag and drop the signature block on to a suitable signing area on the page, click, which opens the signing dialog box so the user can complete the signing process (as illustrated in FIG. 8). Providing and verifying a plurality of signer verification elements and applying the signature to the document are performed in the same ways as described with reference to FIGS. 5 and 6.

FIG. 7 illustrates an exemplary process performed by the Signer Verification/Authentication SMS module 220 for verifying a signer utilizing a one-time signer authentication code received via SMS and other signer verification elements. For signing events, the user is sent a specially formed SMS message like "sureEsign/login?123456" 720 (or a tiny URL) and optionally an email notice indicating that a document needs a signature 702. The SMS includes a 6-digit SMS ID verification code 756 which is generated randomly on the DocServer 112. The user can click on a link 722 in the SMS which will message to launch the mobile device DocViewer application 704 to display the login screen 724. The user is presented with a dialog box which indicates that the user has new documents to sign. The user can navigate and view documents that need to be signed. After viewing the document, the mobile user utilizes the signing dialog window 750 to provide various signer verification elements 706. The user provides a signing Digital ID PIN code 752. In some embodiments the user selects a reason to sign 754. As illustrated here, in mobile devices the SMS ID verification code 756 is pre-filled 708 for the user in the field associated with the signer authentication code 758. The user then selects verify 708 for the signer verification elements to be verified by the Validation System 108.

FIG. 8 provides an alternative illustration of signing dialog window 850. As illustrated with respect to FIG. 7, the signing dialog window is configured to receive the input of a plurality of signer verification elements. These include a signer-specific password 852, a signer's reason for signing 854, and one-time signer authentication/verification code 856 (either manually entered by the user or automatically populated). As illustrated in FIG. 8, in some embodiments, the signer specifies where in the document to apply the signature by, for instance, choosing a button such as "modify location" 802. Furthermore, as illustrated in FIG. 8, in some embodiments, the signer is also allowed to choose a signature style by, for instance, choosing a button such as "select signature style" 804, wherein the user may select a script from a listing of script choices. Once ready, the user indicates that the signer verification elements are ready to be verified by, for instance selecting the "sign now" option 806. Alternatively, the user can stop the process by, for instance, selecting the "cancel" option 808.

FIG. 9 illustrates a screenshot of a signing application, in accordance with one embodiment. The view illustrated in FIG. 9, is displayed on a desktop or tablet device having a large enough screen to allow for navigation within the viewer application. In some embodiments, a user is prompted to enter a username and password to log in to the viewer application in which to view the document. Then, as illustrated in FIG. 9, the viewer application display 900 opens, and the user is presented with a 'task summary' dialog box 902 indicating one or more documents that need to be reviewed and signed 904. For instance, as illustrated in FIG. 9, the user is allowed to navigate within the signing application 900 to see that several documents need to be signed 904. When the user clicks on a particular document to be signed 906, the document is obtained from the Validation System 108 and presented in a document viewer window 908 for viewing and review by the user. Furthermore, as illustrated in FIG. 9, in some embodiments a metadata viewer 910 is also displayed which includes various metadata about the document to be signed such as task, task description, signer (by name or position), content type, which pages to sign, due date, etc.

Figure 10:
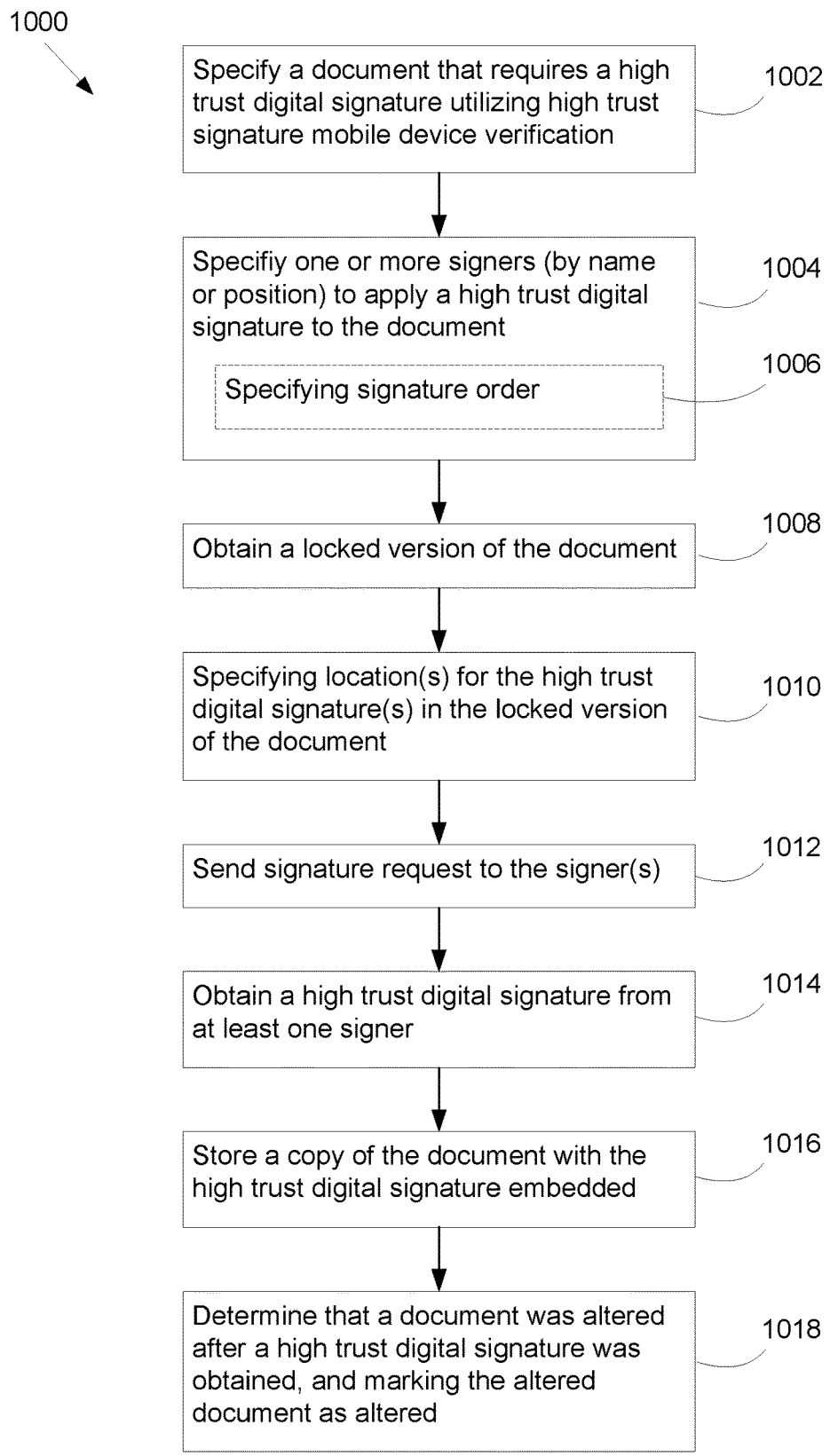
FIG. 10 is a flowchart representing a method of requesting a high trust digital signature in accordance with some embodiments.

FIG. 10 is a flowchart representing a method 1000 of requesting a high trust digital signature in accordance with some embodiments. The computer-implemented method 1000 is performed at a validation server system 108 having one or more processors and memory storing one or more programs for execution by the one or more processors to perform the method. In some embodiments, the Validation System 108 includes an (optional) Front End Server 110, a DocViewer Server 112 (including the workflow management module 260), a Signing Server 114, and a HSM 116 illustrated in FIGS. 1 and 2.

The validation server system 108 specifies a document that requires a high trust digital signature utilizing high trust signature mobile device verification 1002. It is noted that in some embodiments, the specifying and actions taken by the validation server system described below are done based on administrator commands. For instance, the administrator selects the document needing a signature, or the administrator creates a form needing a signature, or creates rules regarding documents needing signatures, and the document is sorted by the validation server system in accordance with the rules.

The validation server system 108 then specifies a signer to apply a high trust digital signature to the document 1004. In some embodiments, a signer can be specified by name (e.g., John Doe) or by position (e.g., Director of Testing for ABC project), or by role (Study Coordinator). In some embodiments, more than one signer is specified. Sometimes the order in which a plurality of Signers sign the document is important, and as such, in some embodiments, a signature order is also specified 1006.

The validation server system 108 then obtains a locked version of the document 1008. In some embodiments, an external content management interface is utilized to get/put documents from/to external systems. In one embodiment, the system uses the published CMIS standard interface to get/put documents. In some embodiments, a locked version of the document is an image version that cannot be altered. For instance, in some embodiments, it is a non-editable pdf.

The validation server system 108 then specifies location for the high trust signature 1010. In some embodiments, more than one signer is specified, and a location is specified for each signer. In some embodiments, the specified location is a specified page within the locked version of the document. In some embodiments, the specified location is a particular location on the specified page. It is noted that, as mentioned above, in some embodiments, the location specified by the validation server system is done according to pre-defined rules. One exemplary rule is to include a specified location for a signature on a line after the word "signature" within the document.

Then a signature request is sent to the one or more Signers 1012. In embodiments where more than one signer is required, and the order of signatures is also specified, the second signer may not be sent the request until after the first signer has signed the document. As noted in other portions of this application the signature request may be sent by email, SMS, or the like. In some embodiments, the signature request will include a one-time signer authentication code generated by the validation server system as described in detail with respect to FIGS. 5 and 6.

A high trust digital signature is then obtained from at least one signer 1014. Details regarding obtaining high trust digital signatures are provided in FIGS. 5 and 6. After at least one high trust digital he validation server system 108 stores a copy of the document with the high trust digital signature embedded 1016. In some embodiments, numerous signed documents are stored in a non-alterable log. The log may be encrypted. As such, documents can be accessed for review, and can be exported, for instance, for reporting purposes. In some embodiments, the log includes information such as the time-stamped record of the signer, the document, the IP address of the signer, and other audit trail details.

In some embodiments, the validation server system 108 determines that the document was altered after the high trust digital signature was obtained. For instance, a document purported to contain the signature can be compared against the version of the document stored in the encrypted non-alterable log. If the validation server system determines that a document was altered, it marks the altered copy of the document as altered 1018. In some embodiments, marking the altered copy of the document as altered further comprises invalidating the high trust digital signature on the altered copy of the document. As such, the system can provide for a high level of trust in its digital signatures and can detect potential issues or fraud associated with digital signatures by saving copies of the digitally signed document and actively marking altered versions as altered and/or invalidating the digital signatures on the altered versions.

In some embodiments, the methods described herein can be used to specify a second document for signing, either simultaneously with the first document, or in series. In these embodiments, a second document that requires a high trust digital signature utilizing high trust signature mobile device verification is specified at 1002. One or more Signers to apply respective high trust digital signatures to the second document are specified at 1004. A locked version of the second document is obtained at 1008. A location for the one or more high trust digital signatures is specified in the locked version of the second document at (1010). Then a signature request regarding the second document is sent to the one or more Signers at 1012. After at least one high trust digital signature has been obtained at 1014 a copy of the second document is stored at 1016. If the validation server system determines that a copy of the second document was altered after the signature was applied, it marks the altered copy of the second document as altered at 1018.

FIG. 11 illustrates a screenshot of a wizard application utilized by an administrator in accordance with one embodiment. As illustrated in FIG. 11, the wizard application allows an administrator to select documents and persons to sign them. The view illustrated in FIG. 11 is displayed on a desktop or tablet device having a large enough screen to allow for navigation within the viewer application. In some embodiments, an administrator user is prompted to enter a username and password to log in to the wizard application. The administrator is then presented with a wizard application display 1100. The administrator can manage various tasks 1102 associated with the signing process such as: selecting a workflow process, selection documents and Signers, creating a signing plan, and notifying a signer or an initiator. FIG. 11 illustrates a situation in which the "select workflow process" task is complete, and the administrator is in the process of completing the task of selecting documents and Signers 1104. A document list is provided 1104. The administrator selects a particular document from the list, which is then displayed in a document viewer display area 1108 for the administrator to review. A signer display area 1110 allows the administrator to select who must sign the document 1112. In FIG. 11, one person, "Lori Albright, Principal Investigator" has been selected. A start date selection option 1114, an end date selection option 1116, and an email notice/reminder option 1118 are also provided so that the administrator can specify in what date range the document needs to be signed and how often to remind the signer.

FIG. 12 illustrates another screenshot of a wizard application utilized by an administrator in accordance with one embodiment. The wizard application allows an administrator to select a signing location within the document to be signed. FIG. 12 is a view that is displayed after the task of FIG. 11 is complete. The administrator is presented with a wizard application display 1100 with various tasks 1102 associated with the signing process. FIG. 12 illustrates a situation in which the "select workflow process" and "select doc and Signers" tasks are complete, and the administrator is in the process of completing the "signing plan" task 1202. The selected document is displayed in a document viewer display area 1108. The administrator is presented with an option for selecting a page for the signature 1204, and can specify a location within the page 1206 (e.g., by placing a signature block on the page) as illustrated in FIG. 12. Then, in some embodiments, the administrator can confirm the signature specification utilizing a selection tool associated with selecting a signing location such as the select button 1208 illustrated in FIG. 12. Also illustrated in FIG. 12 are various signing details which were selected in the previous step as illustrated in FIG. 11. These details include the signer 1112, the due date 1116, and the email notice/reminder 1118 information. Once the signature location is selected, the page(s) needing signature(s) information box 1210 is also populated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and its various embodiments with various modifications as are suited to the particular use contemplated.

What is claimed is:

1. A method, comprising:
at a mobile device having one or more processors and memory storing one or more programs configured for execution by the one or more processors:
receiving a signature request regarding a document that requires a high trust digital signature, the signature request including a one-time signer authentication code;
displaying the document that requires the high trust digital signature on the mobile device; and
obtaining a plurality of signer verification elements, including:
obtaining a signer-specific password;
automatically applying the one-time signer authentication code obtained from the signature request;
obtaining a reason for signing the document, the reason being specified by the signer; and
replying to the signature request by providing the plurality of signer verification elements.

2. The method of claim 1, further comprising displaying the signature request on the mobile device.

3. The method of claim 2, further comprising:
receiving a selection of a link within the signature request; and
in response to the selection, displaying the document that requires the high trust digital signature on the mobile device.

4. The method of claim 1, wherein obtaining the reason for signing the document further comprises receiving a selection of a predefined reason provided to the signer in a drop-down menu.

5. The method of claim 1, wherein obtaining a plurality of signer verification elements further comprises obtaining biometric information of the signer.

6. The method of claim 1, further comprising:
providing evidence of identity for a prospective new signing party by providing an image from a camera on the mobile device; and
receiving approval from an administrative operator viewing the image.

7. The method of claim 6, wherein the administrative operator views the prospective new signing party as well as the evidence of identity in a live video communication.

8. The method of claim 1, further comprising:
obtaining validation for the plurality of signer verification elements from a cloud-based validation service; and
upon obtaining validation, embedding the high trust digital signature into the document.

9. A method, comprising:
at a computer system having one or more processors and memory storing one or more programs configured for execution by the one or more processors:
sending to a mobile device a signature request regarding a document that requires a high trust digital signature, the signature request including a one-time signer authentication code;
sending to the mobile device the document that requires the high trust digital signature;
obtaining from the mobile device a plurality of signer verification elements, including:
a signer-specific password;
the one-time signer authentication code;
a reason for signing the document, the reason being specified by the signer; and
validating the plurality of signer verification elements.

10. The method of claim 9, further comprising:
sending instructions, to the mobile device, to embed the high trust digital signature into the document.

11. The method of claim 9, further comprising after validating the plurality of signer verification elements:
embedding the high trust digital signature into the document.

12. The method of claim 9, wherein the signer verification elements further comprise biometric information of the signer.

13. A method of requesting high trust digital signatures, comprising:
at a computer system having one or more processors and memory storing one or more programs configured for execution by the one or more processors:
specifying a document that requires a high trust digital signature;
specifying a signer to apply a high trust digital signature to the document;
obtaining a locked version of the document;
specifying a location for the high trust digital signature in the locked version of the document; and
sending a signature request to the signer.

14. The method of claim 13, further comprising:
obtaining the high trust digital signature from the signer; and
storing a copy of the document with the high trust digital signature embedded.

15. The method of claim 14, further comprising:
determining that the document was altered after the high trust digital signature was obtained; and
in response to the determination that the document was altered:
marking the altered copy of the document as altered; and
invalidating the high trust digital signature on the altered copy of the document.

16. The method of claim 13, wherein the specified signer is defined by role, position, or name.

17. The method of claim 13, wherein the specified location includes a specified page within the locked version of the document.

18. The method of claim 17, wherein the specified location includes a specified position on the specified page.

19. The method of claim 13, further comprising:
specifying a second signer to apply a second high trust digital signature to the document;
specifying a location for the second high trust digital signature in the locked version of the document; and
sending a signature request to the second signer.

20. The method of claim 19, wherein the high trust digital signature is a first high trust digital signature, the method further comprising:
specifying an order for applying the first high trust digital signature and the second high trust digital signature to the document.

21. A method, comprising:
at a mobile device having a camera, one or more processors, and memory storing one or more programs configured for execution by the one or more processors:
receiving a signature request regarding a document, the signature request including a one-time signer authentication code;
displaying the document on the mobile device;
obtaining a plurality of signer verification elements for a user of the mobile device, including:
 obtaining a signer specific password;
 automatically applying the one-time signer authentication code; and
 using the camera to capture an image that provides evidence of identity of the user; and
replying to the signature request by providing the plurality of signer verification elements.

22. The method of claim 21, wherein the captured image shows both the user and a government-issued identification card for the user.

23. The method of claim 21, further comprising analyzing the captured image to validate the identity of the user.

* * * * *